United States Patent
Kanayama et al.

(10) Patent No.: US 6,727,294 B2
(45) Date of Patent: Apr. 27, 2004

(54) THERMOPLASTIC RESIN COMPOSITION CONTAINING A NAPHTHALENE DICARBOXYLIC ACID MOIETY AND AN ALIPHATIC DIOL MOIETY

(75) Inventors: Satoshi Kanayama, Hiratsuka (JP); Tatsuhiko Hatakeyama, Hiratsuka (JP); Shinya Miya, Hiratsuka (JP); Kenichi Narita, Hiratsuka (JP); Ken Honma, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/768,931

(22) Filed: Jan. 24, 2001

(65) Prior Publication Data

US 2001/0034419 A1 Oct. 25, 2001

Related U.S. Application Data

(63) Continuation-in-part of application No. PCT/JP99/04007, filed on Jul. 27, 1999.

(30) Foreign Application Priority Data

| Jul. 28, 1998 | (JP) | 10-212461 |
| Jan. 25, 2000 | (JP) | 2000-015530 |
| Jan. 25, 2000 | (JP) | 2000-015531 |
| Jan. 25, 2000 | (JP) | 2000-015889 |
| Jan. 25, 2000 | (JP) | 2000-016033 |

(51) Int. Cl.$^7$ .................. C08L 69/00; C08L 67/03; C08L 67/02
(52) U.S. Cl. .................. 523/136; 524/311; 524/313; 524/317; 524/318; 524/323; 525/174; 525/439; 525/444
(58) Field of Search .................. 523/136; 524/311, 524/313, 317, 318, 323; 525/174, 439, 444

(56) References Cited

U.S. PATENT DOCUMENTS

| 4,778,656 A | * | 10/1988 | Allen |
| 5,118,726 A | * | 6/1992 | Mizutani |
| 5,354,802 A | | 10/1994 | Shiwaku et al. |
| 5,804,267 A | * | 9/1998 | Harada |
| 5,807,908 A | * | 9/1998 | Hirose |

FOREIGN PATENT DOCUMENTS

| EP | 0 698 631 A2 | | 2/1996 |
| JP | 2-276856 | * | 1/1990 |
| JP | 08283554 A | | 10/1996 |
| JP | 08325444 A | | 12/1996 |
| JP | 9-157505 | * | 6/1997 |
| JP | 10095903 A | | 4/1998 |

OTHER PUBLICATIONS

EPO Search Report.

* cited by examiner

*Primary Examiner*—David J. Buttner
(74) *Attorney, Agent, or Firm*—Edwards & Angell, LLP; David G. Conlin; Lisa Swiszcz Hazzard

(57) ABSTRACT

A thermoplastic resin composition comprising:
  a transparent aromatic thermoplastic resin (a) and
  a copolyester resin (b) comprising at least two kinds of dicarboxylic acid moieties and one kind of diol moiety, 1 to 50 mol % of the dicarboxylic acid moieties being a naphthalenedicarboxylic acid moiety,
  the ratio of (a) to the combined amount of (a) and (b) being 55 to 99.99% by weight, and the ratio of (b) being 0.01 to 45% by weight.

27 Claims, No Drawings

THERMOPLASTIC RESIN COMPOSITION CONTAINING A NAPHTHALENE DICARBOXYLIC ACID MOIETY AND AN ALIPHATIC DIOL MOIETY

CROSS REFERENCE TO RELATED APPLICATION

This is a continuation-in-part of application Ser. No. (PCT/JP99/04007), filed Jul. 27, 1999 (international filing date), which international application was published in Japanese.

BACKGROUND OF THE INVENTION

The present invention relates to a thermoplastic resin composition, more particularly, relates to a thermoplastic resin composition comprising a transparent aromatic thermoplastic resin such as polycarbonate resins and a specific copolyester resin.

Thermoplastic resins, especially engineering plastics, are used for a variety of purposes because of their excellent mechanical strength and impact resistance. These resins, however, have their own problems. For example, polyester resins, although excellent in chemical resistance, etc., are not necessarily satisfactory in heat resistance, while polycarbonate resins, though possessed of high transparency and heat resistance, are poor in chemical resistance, and thus for such reasons, these thermoplastic resins have been limited in their scope of use.

Hitherto, various proposals involving blending of various types of resins have been made for the improvement of chemical resistance of polycarbonate resins. For instance, Japanese Patent Publication (KOKOKU) No. 36-14035 discloses a thermoplastic material produced by melting and mixing polyethylene terephthalate and a polycarbonate, and Japanese Patent Application Laid-Open (KOKAI) No. 48-96646 discloses a polycarbonate composition containing polytetramethylene naphthalate and/or polyhexamethylene naphthalate, but these products have the disadvantage of being low in transparency.

A resin composition comprising a polycarbonate and polytetramethylene terephthalate is disclosed in Japanese Patent Application Laid-Open (KOKAI) No. 48-54160, but this composition has the problem that its transparency is impaired, though improved in chemical resistance, when the content of polytetramethylene terephthalate is increased. It is thus difficult with this Laid-Open (KOKAI) to obtain a thermoplastic resin composition which is transparent and also excels in chemical and heat resistance.

SUMMARY OF THE INVENTION

An object of the present invention is to provide a thermoplastic resin composition which is transparent and yet has excellent chemical resistance, heat resistance, etc., and which comprises a transparent thermoplastic resin such as a polycarbonate resin and a specific copolyester resin.

In the first aspect of the present invention, there is provided a thermoplastic resin composition comprising:
 a transparent aromatic thermoplastic resin (a) and
 a copolyester resin (b) comprising at least two kinds of dicarboxylic acid moieties and one kind of diol moiety, 1 to 50 mol % of the dicarboxylic acid moieties being a naphthalenedicarboxylic acid moiety,
 the ratio of (a) to the combined amount of (a) and (b) being 55 to 99.99% by weight, and the ratio of (b) being 0.01 to 45% by weight.

In the second aspect of the present invention, there is provided a thermoplastic resin composition as defined in the first aspect, further comprising at least one additive selected from the group consisting of:
 (c) an antioxidant in an amount of 0.001 to 1 part by weight,
 (d) a release agent in an amount of 0.001 to 1 part by weight,
 (e) a weathering resistance improver in an amount of 0.001 to 10 part by weight and
 (f) an ionizing radiation stabilizer in an amount of 0.001 to 20 part by weight, based on the combined amount (100 parts by weight) of the components (a) and (b).

DETAILED DESCRIPTION OF THE INVENTION

The present invention will be explained in detail below. First, explanation is made on the transparent aromatic thermoplastic resins usable as component (a) in the present invention. The "transparent aromatic thermoplastic resins" referred in the present invention designate the thermoplastic resins which have an aromatic ring in the molecule and exhibit a high light transmittance in the visible light range. To put it in a more concrete way, the said transparent aromatic thermoplastic resins are the ones which, when molded into a 3 mm thick product, show a visible light transmittance of not less than 80% as measured according to JIS R 3106. As such transparent aromatic thermoplastic resins, polycarbonate resins, polyarylate resins, polystyrene resins, AS resins and the like are preferably used, but other types of resins such as MS resins, transparent ABS resins, polysulfone resins, polyether sulfone resins, transparent polyamide resins, etc., are also usable. The transparent aliphatic thermoplastic resins such as methacrylic resins are reduced in transparency when a copolyester resin (b) such as mentioned later is blended.

The polycarbonate resins usable as (a) include polymers or copolymers of the thermoplastic aromatic polycarbonates obtained by reacting aromatic dihydroxyl compounds or these compounds plus a small quantity of polyhydroxyl compounds with phosgene or a carbonic acid diester. Such polycarbonates may be branched.

Examples of the aromatic dihydroxyl compounds usable for the above reaction include bis(hydroxyaryl)alkanes such as 2,2-bis(4-hydroxyphenyl)propane (bisphenol A);, 2,2-bis(3,5-dibromo-4-hydroxyphenyl)propane (tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-t-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, and bis(4-hydroxyphenyl)diphenylmethane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,3,5-trimethylcyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3, 3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone, resorcin, 4,4'-dihydroxydiphenyl and the like. If necessary these aromatic dihydroxyl compounds may be used as a mixture of two or more of them. Of these compounds, 2,2-bis(4-hydroxyphenyl)propane is especially preferred.

For obtaining the branched aromatic polycarbonate resins, polyhydroxyl compounds such as phloroglucin, 2,6-dimethyl-2,4,6-tris(4-hydroxyphenyl)-3-heptene, 4,6-dimethyl-2,4,6-tris(4-hydroxyphenyl)-2-heptene, 1,3,5-tris(2-hydroxyphenyl)benzole, 1,1,1-tris(4-hydroxyphenyl)ethane, 2,6-bis(2-hydroxy-5-methylbenzyl-4-methylphenol, and α,α',α"-tris(4-hydroxyphenyl)-1,3,5-triisopropylbenzene; 3,3-bis(4-hydroxyaryl)oxyindole (isatinbisphenol), 5-chloroisatinbisphenol, 5,7-dichloroisatinbisphenol, 5-bromoisatinbisphenol and the like, may be used.

In the case of phosgene process polycarbonates, a terminator or a molecular weight modifier may be used. As such a terminator or molecular weight modifier, there can be used the compounds having monovalent phenolic hydroxyl groups, which include, beside ordinary phenols such as p-t-butylphenol and tribromophenol, long-chain alkylphenols, aliphatic carboxylic acid chloride, aliphatic carboxylic acids, aromatic carboxylic acids, hydroxybenzoic acid alkyl esters, alkyl ether phenols and the like. In the case of the polycarbonate resins used in the present invention, these terminators or molecular weight modifiers may be used if necessary as a mixture of two or more of them.

The polyarylates in the present invention may be the whole aromatic polyester resins comprising aromatic dicarboxylic acids and divalent phenols. Examples of the said aromatic dicarboxylic acids include terephthalic acid, isophthalic acid and the mixture thereof. A typical example of the said divalent phenols is bisphenol A. A whole aromatic polyester comprising terephthalic acid/isophthalic acid and bisphenol A is preferably used.

The polystyrenes in the present invention include, for example, homopolymers obtained by polymerizing the styrene monomers. When the polystyrenes are obtained by polymerizing the styrene monomers, styrene-based monomers such as α-methylstyrene and p-methylstyrene may be partly used. Various polymerization methods such as emulsion polymerization, solution polymerization, suspension polymerization, bulk polymerization, etc., can be used for producing the said polystyrenes. The weight-average molecular weight of these polystyrenes, which can be determined, for example, by the light scattering method, is usually around 100,000 to 500,000.

The AS resins in the present invention may be the random copolymers of acrylonitrile and styrenes, which can be obtained in the same way as the polymerization of polystyrenes.

Molecular weight of the transparent aromatic thermoplastic resin (a), determined as viscosity-average molecular weight converted from the solution viscosity measured in methylene chloride at 25° C., is usually 10,000 to 100,000, preferably 15,000 to 50,000. Polycarbonate resins are especially preferably used as the transparent aromatic thermoplastic resin.

Next, the copolyester resins usable as component (b) in the present invention are explained. In the present invention, there is used a copolyester resin comprising at least two kinds of dicarboxylic acid moieties and one kind of diol moiety, in which 1 to 50 mol % of the whole dicarboxylic acid moiety is a naphthalenedicarboxylic acid. A method for obtaining such a copolyester resin comprises copolymerizing a naphthalenedicarboxylic acid and a dicarboxylic acid other than naphthalenedicarboxylic acid with a diol. In place of the naphthalenedicarboxylic acid and/or said other dicarboxylic acid, ester-forming derivatives of thereof may be used.

As the naphthalenedicarboxylic acid, isomers of various naphthalenedicarboxylic acids such as 2,6-naphthalenedicarboxylic acid, 2,7-naphthalenedicarboxylic acid, 2,3-naphthalenedicarboxylic acid, 1,8-naphthalenedicarboxylic acid, 1,7-naphthalenedicarboxylic acid, 1,6-naphthalenedicarboxylic acid, 1,5-naphthalenedicarboxylic acid, 1,4-naphthalenedicarboxylic acid, 1,3-naphthalenedicarboxylic acid and 1,2-naphthalenedicarboxylic acid can be used. These naphthalenedicarboxylic acid isomers may be used as a mixture of two or more of them. Of these naphthalenedicarboxylic acids, 2,6-naphthalenedicarboxylic acid is especially preferred.

As the dicarboxylic acid other than naphthalenedicarboxylic acids, there can be used, for example, aromatic dicarboxylic acids, alicyclic dicarboxylic acids, aliphatic dicarboxylic acids and oxyacids, of which aromatic dicarboxylic acids are preferred. Examples of such aromatic dicarboxylic acids include phthalic acid, isophthalic acid, terephthalic acid, diphenyldicarboxylic acid, diphenoxyethanedicarboxylic acid, diphenyl ether dicarboxylic acid, and diphenyl ether dicarboxylic acid.

The alicyclic dicarboxylic acids include nuclear hydrogenation compounds of the said aromatic dicarboxylic acids, such as hexahydroterephthalic acid and hexahydroisophthalic acid. The aliphatic dicarboxylic acids include succinic acid, glutamic acid, adipic acid, suberic acid, azelaic acid, sebacic acid, and dodecanedioic acid. The oxyacids include hydroxybenzoic acid and hydroxycaproic acid. These dicarboxylic acids may be used as a mixture of two or more of them as desired. Of these dicarboxylic acids, phthalic acid, isophthalic acid and terephthalic acid are preferred, terephthalic acid being especially preferred.

The diols usable in the present invention include aliphatic diols, alicyclic diols, aromatic diols and ethylene oxide aducts of aromatic diols. Aliphatic diols are preferred. Examples of such aliphatic diols include alkylene diol such as ethylene glycol, 1,2-propanediol, 1,3-propanediol, 1,4-butanediol, 1,5-pentanediol, 1,6-hexanediol, 1,2-decanediol, 1,10-decanediol and neopentyl glycol; and polyalkylene glycols such as diethylene glycol, triethylene glycol, polyethylene glycol, polypropylene glycol, and polytetramethylene glycol.

Examples of the alicyclic diols include 1,2-cyclohexanediol, 1,4-cyclohexanediol, 1,1-cyclohexanedimethanol, 1,4-cyclohexanedimethanol and the like. Examples of the aromatic diols include 2,2-bis(4-hydroxyphenyl)propane, bis(4-hydroxyphenyl)methane, 1,1-bis(4-hydroxyphenyl)ethane, 2,2-bis(4-hydroxy-3-methylphenyl)propane, 1,1-bis(4-hydroxyphenyl)-1-phenylethane, and 1,1-bis(4-hydroxyphenyl)cyclohexane.

Examples of the ethylene oxide adducts of aromatic diols include 2,2-bis(4-β-hydroxyethoxyphenyl)propane and bis(4-β-hydroxyethoxyphenyl)sulfone. These diols may be used as a mixture of two or more of them. Of these diols, ethylene glycol and 1,4-butanediol are preferred, ethylene glycol being especially preferred.

In the copolyester resin (b), the percentage of naphthalenedicarboxylic acid in the dicarboxylic acid moieties is 1 to 50 mol %. If this percentage is less than 1 mol %, the effect of improving chemical resistance is unsatisfactory. If the percentage exceeds 50 mol %, the composition deteriorates in transparency. The lower limit of the percentage of naphthalenedicarboxylic acid in the dicarboxylic acid moiety is preferably not less than 2 mol %, more preferably not less than 4 mol %, even more preferably not less than 6 mol %. The upper limit of the percentage of naphthalenedicarboxylic acid in the dicarboxylic acid moieties is preferably not more than 40 mol %, more preferably not more than 25 mol %.

Molecular weight of the copolyester resin (b) is not specifically defined in the present invention, but when it is expressed in terms of intrinsic viscosity measured in a 5/5 mixed solvent of tetrachloroethane and phenol at 30° C., it is usually 0.3 to 2.0 dl/g, preferably 0.4 to 1.5 dl/g, more preferably 0.5 to 1.4 dl/g.

The ratios of transparent thermoplastic resin (a) and copolyester resin (b) to the combined amount of both resins (a) and (b), are as follows: (a)/(a)+(b)=55 to 99.99% by weight and (b)/(a)+(b)=0.01 to 45% by weight. If the ratio of copolyester resin (b) is less than 0.01% by weight, the chemical resistance improving effect is unsatisfactory, and if this ratio exceeds 55% by weight, the composition becomes unsatisfactory in heat resistance. The lower limit of the ratio of copolyester resin (b) is preferably not less than 0.1% by weight, more preferably not less than 0.2% by weight, even more preferably not less than 0.5% by weight. The upper limit of the ratio of copolyester resin (b) is especially preferably not more than 40% by weight.

The thermoplastic resin composition of the present invention can be produced, for example, by a method in which the component resins are blended and kneaded in the various ways known to those skilled in the art at any suitable stage in the process till the point just before final molding. Blending can be effected in the various ways, such as using a suitable mixer like tumbler or Henschel mixer, or supplying the determined amounts of resins to the extruder hopper by a feeder and mixing them. Kneading can be accomplished, for example, by a method using a single- or double-screw extruder.

In the present invention, in order to enhance the stability of the resin composition during the molding process, it is preferred to blend an antioxidant (c) into the resin composition.

The antioxidant (c) used in the present is now explained. The antioxidants usable in the present invention are not specifically defined and include, for example, phosphoric antioxidants, phenolic antioxidants and sulfuric antioxidants.

Examples of the phenolic antioxidants include 1,1-bis(5-t-butyl-2-methyl-4-hydroxyphenyl)butane, 1,1,3-tris(5-t-butyl-2-methyl-4-hydroxyphenyl)butane, octadecyl-3-(3,5-di-t-butyl-4-hydroxyphenyl) propionate, pentaerythrityltetrakis(3-(3,5-di-t-butyl-4-hydroxyphenyl) propionate, 2,2-thio-diethylenebis(3-(3,5-di-t-butyl-4-hydroxyphenyl) propionate, 3,9-bis(2-(3-(3-t-butyl-4-hydroxy-5-methylphenyl)-propionyloxy)-1,1-dimethylethyl)-2,4,8,10-tetraoxaspiro[5,5]undecane, 1,3,5-trimethyl-2,4,6-tris(3,5-di-t-butyl-4-hydroxybenzyl) benzene, tris-(3,5-di-t-butyl-4-hydroxybenzyl) isocyanurate, triethylene glycol-bis(3-(3-t-butyl-5-methyl-4-hydroxyphenyl) propionate), 1,6-hexanediol-bis(3-(3,5-di-t-butyl-4-hydroxyphenyl) propionate), 2,4-bis-(n-octylthio)-6-(4-hydroxy-3,5-di-t-butylanilino)-1,3,5-triazine, N,N'-hexamethylenebis(3,5-di-t-butyl-4-hydroxyhydrocinnamide), N,N'-bis(3-(3,5-di-t-butyl-4-hydroxyphenyl)propionyl)hydrazine, 2,2'-thiobis(4-methyl-6-t-butylphenol), 3,5-di-t-butyl-4-hydroxybenzyl phosphonate diethyl ester, 4,4'-thiobis-(3-methyl-6-t-butylphenol), 4,4'-thiobis-(2-methyl-6-t-butylphenol), 2,2'-methylenebis(4-methyl-6-t-butylphenol), and 2,2'-ethylidenebis(4,6-di-t-butylphenol). These compounds may be used either singly or as a mixture of two or more.

Examples of the phosphoric antioxidants include triphenyl phosphite, tris(nonylphenyl) phosphite, dilaurylhydrogen phosphite, triethyl phosphite, tridecyl phosphite, tris(2-ethylhexyl) phosphite, tris(tridecyl) phosphite, tristearyl phosphite, diphenyl monodecyl phosphite, monophenyl didecyl phosphite, diphenyl mono(tridecyl) phosphite, tetraphenyl dipropyleneglycol diphosphite, tetraphenyl tetra (tridecyl) pentaerythritol tetraphosphite, hydrogenated bisphenol A phenol phosphite polymer, diphenyl hydrogen phosphite, 4,4'-butylidene-bis(3-methyl-6-t-butylphenyldi (tridecyl) phosphite), tetra(tridecyl) 4,4'-isopropylidenediphenyl diphosphite, bis(tridecyl) pentaerythritol diphosphite, bis(nonylphenyl) pentaerythritol diphosphite, dilauryl pentaerythritol diphosphite, distearyl pentaerythritol diphosphite, tris(4-t-butylphenyl) phosphite, tris(2,4-di-t-butylphenyl) phosphite, hydrogenated bisphenol A-pentaerythritol phosphite polymer, tetrakis(2,4-di-t-butylphenyl) 4,4'-biphenylene phosphonite, bis(2,4-di-t-butylphenyl) pentaerythritol diphosphite, bis(2,6-di-t-butyl-4-methylphenyl) pentaerythritol diphosphite, 2,2'-methylenebis(4,6-di-t-butylphenyl) octyl phosphite, ethyl diethyl phosphonoacetate, methyl acid phosphate, ethyl acid phosphate, butyl acid phosphate, butoxyethyl acid phosphate, octyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxypolyethylene glycol acid phosphate, bisphenol A acid phosphate, diethyl phosphate, dibutyl phosphate, dioctyl phosphate, dilauryl phosphate, distearyl phosphate, diphenyl phosphate, bis-nonylphenyl phosphate, and hexamethyl phosphoric triamide. These compounds may be used either singly or as a mixture of two or more.

Examples of the sulfuric antioxidants include dodecyl 3,3'-thiodipropionate, ditetradecyl 3,3'-thiodipropionate, dioctadecyl 3,3'-thiodipropionate, ditridecyl-3,3'-thiodipropionate, pentaerythrityl tetrakis(3-dodecyl thiopropionate), pentaerythrityl tetrakis(3-tetradecyl thiopropionate), and pentaerithrityl tetrakis(3-tridecyl thiopropionate). These compounds may be used either singly or as a mixture of two or more.

The above antioxidants may be used either singly or by mixing two or more of them. Generally, phenolic antioxidants are preferable for their excellent discoloration protecting ability for resins, while phosphoric antioxidants are advantageous in terms of polymer processing stability. Sulfuric antioxidants, although showing an excellent antioxidative effect, sometimes prove to be poor in light stability, so that they are preferably used in applications where light stability is not strongly required, or used in combination with other type of antioxidant or other additive(s) having high light stability.

In the phosphoric antioxidants, long-chain dialkyl acid phosphate type compounds are especially effective for preventing deterioration of properties of polyester resins when they are heated. Therefore, these compounds are also preferable to blend into the resin composition of the present invention.

In the present invention, it is preferable to use the said antioxidants in optimal combinations in view of their respective characteristics, such as combinations of a phenolic antioxidant and another phenolic antioxidant, a phenolic antioxidant and a phosphoric antioxidant, a phenolic antioxidant and a sulfuric antioxidant, a phosphoric antioxidant and another phosphoric antioxidant, and a phenolic antioxidant and two types of phosphoric antioxidant. Use of such combinations of antioxidants can realize the provision of desired properties to the resin composition.

The amount of the antioxidant (c) blended into the resin composition is usually 0.001 to 1 part by weight based on the combined amount (100 parts by weight) of the components (a) and (b). If the ratio of antioxidant (c) is less than 0.001 part by weight, its effect of improving stability in the polymer processing may be insufficient. When the ratio of (c) exceeds 1 part by weight, the polymer processing stability may be also impaired. The lower limit of the ratio of antioxidant (c) is preferably 0.005 part by weight, more preferably 0.01 part by weight. Its upper limit is preferably 0.8 part by weight.

In the present invention, in order to improve the releasability of the resin composition during the polymer processing, it is preferred to blend a release agent (d) into the resin composition.

As the release agent in the present invention, there can be used the compounds which are generally known as release agent or lubricant. Such compounds include, for example, hydrocarbons, fatty acids, fatty acid amides, fatty acid esters, fatty acid metallic soaps, fatty alcohols, polyhydric alcohols, partial esters of fatty acids, and silicone oils. These compounds may be used either singly or as a mixture of two or more.

Examples of the hydrocarbons usable as (d) in the present invention are liquid paraffin, paraffin wax, microwax and polyethylene wax, which may be used either singly or as a mixture of two of more.

The fatty acids usable as (d) in the present invention include those having 10 or more carbon atoms in the molecule, such as lauric acid, myristic acid, palmitic acid, stearic acid, montanic acid, oleic acid, linolic acid and ricinoleic acid. They may be used either singly or as a mixture of two or more.

The fatty acid amides usable as (d) include the monoamides or bisamides of the fatty acids mentioned above, which include, for example, capric acid amide, lauric acid amide, myristic acid amide, palmitic acid amide, stearic acid amide, erucic amide, methylenebisstearic acid amide, ethylenebisstearic acid amide, ethylenebisoleic acid amide, and ethylenebishydroxystearic acid amide. These compounds may be used either singly or as a mixture of two or more.

The fatty acid metallic soaps usable in the present invention include the metal salts of the said fatty acids, such as calcium laurate, sodium stearate, calcium stearate, magnesium stearate, lead stearate, zinc stearate, potassium stearate, lithium behenate, strontium behenate, barium behenate, cesium behenate, and magnesium montanate. Either single or combined use of these compounds is possible.

The fatty alcohols usable in the present invention include those having 10 or more carbon atoms in the molecule, for example, decyl alcohol, dodecyl alcohol, lauryl alcohol, myristyl alcohol, cetyl alcohol, stearyl alcohol, ceryl alcohol and myricyl alcohol. They may be used alone or as a combination of two or more.

The polyhydric alcohols include ethylene glycol, propylene glycol, butylene glycol, hexanediol, polyethylene glycol, polypropylene glycol, glycerin, butanetriol, pentanetriol, erythritol and pentaerythritol. Either single or combined use of these alcohols is possible.

The silicone oils include dimethyl silicone oil, phenylmethyl silicone oil, diphenyl silicone oil and fluorinated alkyl silicone. They may be used either singly or as a mixture of two or more.

The acids constituting the said esters and partial esters of fatty acids include, beside the above fatty acids, lower fatty acids such as acetic acid, aromatic carboxylic acids such as benzoic acid, and polyvalent acids such as adipic acid, dodecanedioic acid, phthalic acid, trimellitic acid and pyromellitic acid, and oxyacids such as hydroxycaproic acid. The esters and partial esters include the complete or partial esters obtained from a dehydration reaction with certain types of alcohol which include, beside the said fatty alcohols and polyhydric alcohols, lower alcohols such as methanol and aromatic alcohols such as phenol and benzyl alcohol. More concretely, such compounds include methyl stearate, butyl stearate, butyl laurate, butyl palmitate, butyl montanate, propyl stearate, phenyl stearate, lauryl acetate, stearyl acetate, stearyl laurate, stearyl stearate, behenyl behenate, behenyl benzoate, glycerin tristearate, pentaerythritol tetrastearate, pentaerythritol tetrabehenate, glycerin dilaurate, glycerin monobehenate, pentaerythritol trilaurate, pentaerythritol distearate, pentaerythritol monobehenate and beeswax. It is possible to use these compounds either singly or as a mixture of two or more.

Generally, release agents may be the compounds having 10 or more carbon atoms in the molecule. It is also notable that among the compounds mentioned above, hydrocarbons and silicone compounds are poor in compatibility with transparent aromatic thermoplastic resins (particularly polycarbonates), so that use of such compounds tends to lower transparency of the composition. In contrast with this, if a polar group such as carbonyl group, ester group or hydroxyl group is present in the molecule, as in the said fatty acids and esters, the compatibility with transparent aromatic thermoplastic resins (particularly polycarbonates) is bettered, allowing obtainment of a composition with good transparency.

On the other hand, in the case of the compounds having a hydroxyl group in the molecule, such as aliphatic alcohols, polyhydric alcohols and partial esters of fatty acids, care should be taken in conducting molding with a long retention time in the molding machine, as in the case of oversized molding. It should be also noted that the fatty acid amides, fatty acid metallic soaps and fluorine-containing sulfonic compounds have a tendency to become tinged.

As release agent (d) used in the present invention, higher fatty acids and their esters, especially higher alcohol esters of higher fatty acids are preferred. Polyhydric alcohol esters of higher fatty acids are also preferable.

The amount of the release agent (d) blended into the resin composition is usually 0.001 to 1 part by weight based on the combined amount (100 parts by weight) of the components (a) and (b). When the ratio of release agent (d) is less than 0.001 part by weight, its effect of improving releasability may be unsatisfactory, and when its ratio exceeds 1 part by weight, there results a greater degree of impairment of properties than the releasability improving effect. The lower limit of the ratio of release agent (d) is preferably 0.005 part by weight, more preferably 0.01 part by weight, and its upper limit is preferably 0.8 part by weight.

In the present invention, in order to improve the light resistance and weathering resistance of the resin composition, it is preferred to blend a weathering resistance improver (e) into the resin composition.

Used as weathering resistance improver in the present invention may be a compound which is generally known as an ultraviolet absorber or light stabilizer. This agent is expected to function to make harmless visible light rays or ultraviolet rays by absorbing their light energy and converting it into heat energy, or to function to render harmless the precursor generated by the photochemical actions.

As such weathering resistance improver, various types of compounds such as benzophenone-based, benzotriazole-based, salicylic ester-based, benzoate-based, triazine-based, hindered amine-based and cinnamyl-based compounds can be used either independently or as a mixture of two or more of them.

Examples of the benzophenone-based compounds include 2,4-dihydroxybenzophenone, 2-hydroxy-4-methoxybenzophenone, 2-hydroxy-4-octyloxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxybenzophenone-5-sulfonic acid trihydrate, and bis (2-hydroxy-3-benzoyl-6-methoxyphenyl)methane.

Examples of the benzotriazole-based compounds include 2-(2-hydroxy-5-methylphenyl)-2H-benzotriazole, 2-(2-hydroxy-3,5-di-t-butylphenyl)-2H-benzotriaz, 2-(2-hydroxy-3-t-butyl-5-methylphenyl)-2H-benzotriazole, 2-(2-hydroxy-5-t-octylphenyl)-2H-benzotriazole, 2-(3,5-di-t-octyl-2-hydroxyphenyl)-2H-benzotriazole, 2-(3,5-di-t-amyl-2-hydroxyphenyl)-2H-benzotriazole, 2-(3-lauryl-5-methyl-2-hydroxyphenyl)-2H-benzotriazole, 2-(3,5-di-t-butyl-2-hydroxyphenyl)-5-chloro-2H-benzotriazole, 2-(3-t-butyl-5-methyl-2-hydroxyphenyl)-5-chloro-2H-benzotriazole, 2-(3,5-bis(1-methyl-1-phenylethyl)-2-hydroxyphenyl)-2H-benzotriazole, bis(3-(2H-benzotriazole-2-yl)-2-hydroxy-5-methylphenyl)methane, bis(3-(2H-benzotriazole-2-yl)-2-hydroxy-5-(1,1,3,3-tetramethylbutyl)phenyl)methane, bis(3-(2H-benzotriazole-2-yl)-2-hydroxy-5-cumylphenyl)methane, bis(3-(2H-benzotriazole-2-yl)-2-hydroxy-5-octylphenyl)methane, 1,1-bis(3-(2H-benzotriazole-2-yl)-2-hydroxy-5-methylphenyl) octane, 1,1-bis(3-(2H-5-chlorobenzotriazole-2-yl)-2-hydroxy-5-methylphenyl)octane, 1,2-ethanediyl bis(3-(2H-benzotriazole-2-yl)-2-hydroxybenzoate), 1,12-dodecanediyl bis(3-(2H-benzotriazole-2-yl)-4-hydroxybenzoate), 1,3-cyclohexanediyl bis(3-(5-chloro-2H-benzotriazole-2-yl)-2-hydroxybenzoate), 1,4-butanediyl bis(3-(2H-benzotriazole-2-yl)-4-hydroxy-5-methylphenylethanoate), 3,6-dioxa-1,8-octanediyl bis(3-(5-methoxy-2H-benzotriazole-2-yl)-4-hydroxyphenylethanoate, 1,6-hexanediyl bis(3-(3-(2H-benzotriazole-2-yl)-4-hydroxy-5-t-butylphenyl) propionate), p-xylenediyl bis(3-(3-(2H-benzotriazole-2-yl)-4-hydroxyphenyl) propionate, bis(3-(2H-benzotriazole-2-yl)-4-hydroxytoluyl) malonate, bis(2-(3-(2H-benzotriazole-2-yl)-4-hydroxy-5-octylphenyl(ethyl) terephthalate, bis(3-(2H-benzotriazole-2-yl)-4-hydroxy-5-propyltoluyl) octadioate, 2-(2H-benzotriazole-2-yl)-6-phthalimidomethyl-4-methylphenol, 2-(2H-benzotriazole-2-yl)-6-phthalimidoethyl-4-methylphenol, 2-(2H-benzotriazole-2-yl)-6-phthalimidooctyl-4-methylphenol, 2-(2H-benzotriazole-2-yl)-6-phthalimidomethyl-4-t-butylphenol,2-(2H-benzotriazole-2-yl)-6-phthalimidoethyl-4-cumylphenol, and 2-(2H-benzotriazole-2-yl)-4,6-bis (phthalimidomethyl)phenol.

Examples of the salicylic ester-based compounds include phenyl salicylate, and 2,4-di-t-butylphenyl 3,5-di-t-butyl-4-hydroxybenzoate.

A typical example of the benzoate-based compounds is 2,4-di-t-butylphenyl 3,5-di-t-butyl-4-hydroxybenzoate.

An example of the triazine-based compounds is 2-(4,6-diphenyl-1,3,5-triazine-2-yl)-5-hexyloxyphenol.

Examples of the hindered amine-based compounds include bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butylmalonate, dimethyl succinate/1-(2-hydroxyethyl)-4-hydroxy-2,2,6,6-tetramethylpiperidine polycondensate, poly((6-(1,1,3,3-tetramethylbutyl)amino-1,3,5-triazine-2,4-diyl) ((2,2,6,6-tetramethyl-4-piperidyl) imino)hexamethylene((2,2,6,6-tetramethyl-4-piperidyl) imino)), N,N'-bis(3-aminopropyl)ethylenediamine/2,4-bis (N-butyl-N-(1,2,2,6,6-pentamethyl-4-piperidyl)amino)-6-chloro-1,3,5-triazine condensate, tetrakis(2,2,6,6-tetramethyl-4-piperidyl) 1,2,3,4-butanetetracarboxylate, and tetrakis(1,2,2,6,6-pentamethyl-4-piperidyl) 1,2,3,4-butanetetracarboxylate.

Among other compounds usable as weathering resistance improver in the present invention are 2-ethoxy-2'-ethyloxalic acid bisanilide, ethyl 2-cyano-3,3-diphenylacrylate, and 2-ethylhexyl 2-cyano-3,3-diphenylacrylate.

The amount of the resistance improver (e) blended into the resin composition is usually 0.001 to 10 part by weight based on the combined amount (100 parts by weight) of the components (a) and (b). When the ratio of component (e) is less than 0.001 part by weight, the weathering resistance improving effect of (e) may be unsatisfactory, and when the ratio exceeds 10 parts by weight, the produced composition may deteriorate in mechanical properties and heat resistance. The lower limit of the ratio of component (e) is preferably 0.005 part by weight, more preferably 0.01 part by weight, and its upper limit is preferably 5 parts by weight, more preferably 3 parts by weight.

Further, in the present invention, by blending an ionizing radiation stabilizer (f) into the resin composition, there can be obtained the resin composition having stability against to the ionizing radiations, and it can be preferably used for medical supplies.

In use of the thermoplastic resins for medical supplies, they are usually subjected to perfect sterilization. Such perfect sterilization can be effectuated by various methods such as high-pressure steam sterilization, ethylene oxide gas (EOG) sterilization, and exposure to ionizing radiations such as gamma rays or electron rays. Of these methods, high-pressure steam sterilization method has the disadvantages of being high in energy cost and of necessitating a drying step after the sterilization treatment. EOG sterilization method is at a disadvantage in that EOG itself is toxicant, and that this method involves the environmental problems relating to waste disposal. Recently, therefore, ionizing radiation (usually gamma ray) exposure method, which is relatively inexpensive and capable of low-temperature dry treatment, is preferably used. This method, however, also has the problem that the transparent aromatic thermoplastic resins such as polycarbonate resins are discolored to a yellowish tinge when exposed to ionizing radiations, which may badly impair the commercial value of the products, especially in medical applications.

As a solution to the problem of yellowish discoloration of polycarbonate resins on exposure to ionizing radiations, there have been proposed various measures such as: blending a halogen-containing polycarbonate resin (Japanese Patent Application Laid-Open (KOKAI) No. 2-55062); blending a nucleic brominated phthalic acid derivative (Japanese Patent Application Laid-Open (KOKAI) No. 5-179127); blending a halogen-containing polycarbonate resin and a polyalkylene glycol (Japanese Patent Application Laid-Open (KOKAI) No. 2-238049); blending a halogen-containing polycarbonate resin and a carboxylic acid ester of a polyalkylene glycol (Japanese Patent Application Laid-Open (KOKAI) No. 2-265957). These proposed methods, however, had the problems such that discoloration preventive effect is insufficient and when the amount is sufficient to prevent the discoloration, the other properties are deteriorated.

Therefore, in order to improve the stability against to the ionizing radiations, especially, when used for medical supplies, it is preferred to blend an ionizing radiation stabilizer (f) into the resin composition.

The "ionizing radiation stabilizer" used in the present invention is a compound having an action to check deterioration of properties such as discoloration of thermoplastic resin compositions when exposed to ionizing radiations such as gamma rays or electron rays. The following compounds (1)–(9) can be cited, for example, as ionizing radiation stabilizer usable in the present invention. These compounds may be used either singly or as a mixture of two or more.

(1) Halogenated aromatic compounds
(2) Polyalkylene glycols and their derivatives
(3) Aromatic hydrocarbon-aldehyde resins
(4) Aromatic compounds having oxy or carbonyl group
(5) Compounds having cyclic acetal group
(6) Compounds having oxymethylene units, compounds having substituted oxymethylene units or substituted cyclic ether compounds
(7) Sulfonic compounds
(8) Sulfoxide compounds
(9) Sulfonic acid-based compounds
(10) Sulfide compounds
(11) Sulfonamide compounds
(12) Aromatic compounds having carbon-carbon double bond
(13) Compounds generating active radicals or active ions on exposure to ultraviolet rays or visible light rays
(14) Aromatic amine-based compounds
(15) Compounds having a saturated heterocyclic ring containing nitrogen (1) Halogenated Aromatic Compounds "Halogenated aromatic compounds" in the present invention are the compounds having a halogen atom attached to the molecule. The halogen atom may be bromine atom, chlorine atom, iodine atom, etc., but it is preferably bromine or chlorine atom, bromine atom being especially preferred.

Examples of such halogenated aromatic compounds are alkylene oxide adducts of halogenated aromatic dihydroxyl compounds, halogenated aromatic dihydroxyl compound type epoxy compounds, halogenated polycarbonates, etc., but the compounds containing in their molecular chains the structural units derived from halogenated aromatic dihydroxyl compounds are preferred.

Examples of the said halogenated aromatic dihydroxyl compounds include 2,2-bis(3,5-dibromo-4-hydroxyphenyl)propane (=tetrabromobisphenol A), bis(3,5-dibromo-4-hydroxyphenyl)methane, 2,2-bis(3-bromo-4-hydroxyphenyl)propane, 2,2-bis(3,5-dichloro-4-hydroxyphenyl)propane, bis(3-bromo-4-hydroxyphenyl)methane, bis(3-chloro-4-hydroxyphenyl)methane, bis(3,5-dichloro-4-hydroxyphenyl)methane, and 4,4'-dihydroxy-3,3',5,5'-tetrabromodiphenyl sulfide. Of these compounds, 2,2-bis(3,5-dibromo-4-hydroxyphenyl)propane (=tetrabromobisphenol A) is preferred. These compounds may be used either singly or as a mixture of two or more.

The said halogenated polycarbonates include polymers and oligomers of halogenated polycarbonates, but they are preferably polymers or oligomers of halogenated polycarbonates containing in their molecular chains the structural units derived from halogenated aromatic dihydroxyl compounds.

The said halogenated polycarbonates can be produced, for example, by a method in which when a divalent phenolic compound is reacted with phosgene or a carbonic acid diester, a halogenated aromatic dihydroxyl compound is used as a part or whole of the divalent phenolic compound. Examples of such halogenated polycarbonates include (1) halogenated polycarbonate copolymers using a halogenated aromatic dihydroxyl compound as part of the aromatic dihydroxyl compound, (2) halogenated polycarbonate homooligomers using a halogenated aromatic dihydroxyl compound alone as the aromatic dihydroxyl compound, and (3) halogenated polycarbonate oligomers using a halogenated aromatic dihydroxyl compound as part of the aromatic dihydroxyl compound.

In production of halogenated polycarbonates by the phosgene method, it is possible to use an terminator or a molecular weight modifier. As such an terminator and molecular weight modifier, there can be used, for instance, the compounds having a monovalent phenolic hydroxyl group, which include phenol, p-t-butylphenol, tribromophenol, long-chain alkylphenols, aliphatic carboxylic acid chloride, aromatic carboxylic acids, aliphatic carboxylic acids, hydroxybenzoic acid alkyl esters, alkyl ether phenols, halogenated phenols, halogenated aromatic carboxylic acids, and halogenated aliphatic carboxylic acids. These end stoppers and molecular weight modifiers may be used either singly or as a mixture of two or more.

Viscosity-average molecular weight of the said halogenated polycarbonates, as computed from the solution viscosity measured in methylene chloride at 25° C., is ordinarily 1,000 to 100,000. When the viscosity-average molecular weight of this resin is less than 1,000, the resin tends to bleed out from the molded product in the course of molding, and when it exceeds 100,000, fluidity of the resin lowers to adversely affect visual appearance of the molded product. Viscosity-average molecular weight of the said halogenated polycarbonates is preferably 2,000 to 50,000, more preferably 3,000 to 40,000.

Concrete examples of the said halogenated polycarbonates are (1) copolymerpolycarbonates using 2,2-bis(4-hydroxyphenyl)propane (=bisphenol A) and 2,2-bis(3,5-dibromo-4-hydroxyphenyl)propane (=tetrabromobisphenol A), (2) compositions comprising polycarbonate resins using bisphenol A and copolymerpolycarbonates of (1) described above, (3) compositions comprising polycarbonate resins using bisphenol A and polycarbonate oligomers using tetrabromobisphenol A, and (4) compositions comprising polycarbonate resins using bisphenol A and polycarbonate co-oligomers using tetrabromobisphenol A and bisphenol A.

The said alkylene oxide adducts of halogenated aromatic dihydroxyl compounds may be the compounds obtained from the said halogenated aromatic dihydroxyl compounds and alkylene oxide, for example, adduct of tetrabromobisphenol A with 2 moles of ethylene oxide and adduct of tetrabromobisphenol A with 4 moles of ethylene oxide, which are commercially available.

The said halogenated aromatic dihydroxyl compound type epoxy compounds may be the condensates of the said halogenated aromatic dihydroxyl compounds and epichlorohydrin, which are commercially available as halogenated phenoxy resins or halogenated bisphenolic epoxy resins.

(2) Polyalkylene Glycols or Their Derivatives

"Polyalkylene glycols or their derivatives" in the present invention include polyalkylene glycols or their ethers or esters.

Specific examples of the polyalkylene glycol or derivatives thereof may include polyethylene glycol, polyethylene glycol methylether, polyethylene glycol dimethylether, polyethylene glycol dodecylether, polyethylene glycol benzylether, polyethylene glycol dibenzylether, polyethylene glycol 4-nonylphenylether, polypropylene glycol, polypropylene glycol methylether, polypropylene glycol dimethylether, polypropylene glycol dodecylether, polypropylene glycol benzylether, polypropylene glycol dibenzylether, polypropylene glycol 4-nonylphenylether, polytetramethylene glycol, polyethylene glycol diacetate, polyethylene glycol (monoacetate)monopropionate, polyethylene glycol dibutyrate, polyethylene glycol distearate, polyethylene glycol dibenzoate, polyethylene glycol di-2,6-dimethyl-benzoate, polyethylene glycol di-p-tert-butyl benzoate, polyethylene glycol dicaprylate, polypropylene glycol diacetate, polypropylene glycol monoacetate monopropionate, polypropylene glycol dibutyrate, polypropylene glycol distearate, polypropylene glycol dibenzoate, polypropylene glycol di-2,6-dimethyl benzoate, polypropylene glycol di-p-tert-butyl benzoate, polypropylene glycol dicaprylate, or the like. These polyalkylene glycols or their ethers or esters may be used singly or in the form of the mixture thereof.

(3) Aromatic Hydrocarbon-aldehyde Resins

"Aromatic hydrocarbon-aldehyde resins" in the present invention are the resins obtained by reacting aromatic hydrocarbons with aldehydes in the presence of an acid catalyst.

The aromatic hydrocarbon-aldehyde resins used in the composition according to the present invention may be prepared by reacting aromatic hydrocarbon with aldehyde in the presence of an acid catalyst.

Specific examples of the aromatic hydrocarbons used for the preparation of the aromatic hydrocarbon-aldehyde resins may include monocyclic aromatic hydrocarbon compounds such as benzene, toluene, ethyl benzene, xylene, methylethyl benzene, trimethyl benzene, tetramethyl benzene, pseudo-cumene or cumene, polycyclic aromatic hydrocarbon compounds such as naphthalene, methyl naphthalene, ethyl naphthalene, dimethyl naphthalene, acenaphthene, anthracene or the like. These aromatic hydrocarbon compounds may be used singly or in the form of the mixture thereof. Among them, the especially preferred aromatic hydrocarbon compounds are toluene, xylene, mesitylene, pseudo-cumene or naphthalene.

Specific examples of the aldehydes used for the preparation of the aromatic hydrocarbon-aldehyde resins may include saturated aliphatic aldehydes such as formaldehyde, acetaldehyde, propionaldehyde, butylaldehyde, iso-butylaldehyde, valeraldehyde, laurinaldehyde or stearinaldehyde; aliphatic polyvalent aldehydes such as glyoxal or succindialdehyde; unsaturated aliphatic aldehydes such as acrolein, crotonaldehyde or propiolaldehyde; aromatic aldehydes such as benzaldehyde, tolylaldehyde, salicylaldehyde, cinnamaldehyde or naphthaldehyde; heterocyclic aldehydes such as furfural; aldehyde derivatives such as methylal, dioxolane, trioxane, tetraoxane, paraformaldehyde, paraldehyde or metaldehyde, or the like. These aldehydes may be used singly or in the form of the mixture thereof. Among them, the especially preferred aldehydes are formaldehyde, trioxane, paraformaldehyde or acetaldehyde.

Such aromatic hydrocarbon-aldehyde resins are commercially available. For example, as the commercially available aromatic hydrocarbon-aldehyde resins, NICANOL DS, NICANOL S, NICANOL K, NICANOL H, NICANOL L, NICANOL G or NICANOL Y (produced by Mitsubishi Gas Chemical Co., Ltd.), GENERITE 6010 or GENERITE 5100 (produced by General Petroleum Chemical Co., Ltd.), may be exemplified. Further, the aromatic hydrocarbon-aldehyde resins can be prepared according to methods disclosed in Japanese Patent Application Laid-open (KOKAI) Nos. 60-51133 (1985), 61-223016 (1986), 61-213216 (1986), 63-196616 (1988), 4-224825 (1992), 4-335014 (1992), 5-186544 (1993), 6-136081 (1994) and the like. These aromatic hydrocarbon-aldehyde resins may be used singly or in the form of the mixture thereof.

(4) Aromatic Compounds having Oxy Group or Carbonyl Group

"Aromatic compounds having oxy group or carbonyl group" in the present invention are specifically the compounds of a structure in which an oxy group or a carbonyl group is bonded to the aromatic ring directly or with the interposition of one carbon atom.

Examples of such aromatic compounds include benzyl alcohol, phenethyl alcohol, p-methylbenzyl alcohol, 1,4-bishydroxymethylbenzene, diphenyl ether, dibenzyl ether, benzyl methyl ether, benzyl phenyl ether, benzyl naphthyl ether, 1,4-benzodioxane, 1,2-(methylenedioxy)benzene, benzoin, benzoin ethyl ether, benzhydrol, hydrobenzoin, 1,4-bismethoxymethylbenzene, piperonyl alcohol, benzophenone, dibenzyl ketone, benzyl methyl ketone, benzyl phenyl ketone, benzyl tolyl ketone, benzyl naphthyl ketone, dibenzoyl, benzoyl cyclobutane, benzoyl propane, 1,2-dibenzoyl benzene, 1,4-bis(methoxymethyl)benzene, benzyl phenyl acetate, benzyl benzoate, benzyl butyl phthalate, dicyclohexyl phthalate, benzyldimethylketal, dibenzoylmethane, dibenzoylpropane, 1,2-dibenzyloxyethane, hydroquinonedibenzyl ether and o-xylylene oxide. These compounds may be used either singly or as a mixture of two or more.

(5) Compounds having Cyclic Acetal Group

"Compounds having cyclic acetal group" in the present invention may be a sort of heterocyclic compounds having a structure in which two oxy groups are bonded to each other via a carbon atom in the same ring.

Specific examples of the compound having cyclic acetal group may include 2,2'-ethylene bis-1,3-dioxolane, 2,2'-trimethylene bis-1,3-dioxolane, 2,2 '-phenylene bis-1,3-dioxolane, 1,3-dioxolane, 2-methyl-1,3-dioxolane, 2-methyl-4-methyl-1,3-dioxolane, 2-pentyl-4-methyl-1,3-dioxolane, 2-n-hexyl-1,3-dioxolane, 2-octyl-4-methyl-1,3-dioxolane, 2-methoxy-1,3-dioxolane, 2-chloromethyl-1,3-dioxolane, 2-bromomethyl-1,3-dioxolane, 2-(2-bromoethyl)-1,3-dioxolane, 2-aminomethyl-1,3-dioxolane, 2-(2-aminoethyl)-1,3-dioxolane, 2-phenyl-1,3-dioxolane, 2-phenyl-4-methyl-1,3-dioxolane, 4-phenyl-1,3-dioxolane, 2-(1-phenylethyl)-1,3-dioxolane, 2-(1-phenylethyl)-4-methyl-1,3-dioxolane, 2-benzyl-1,3-dioxolane, 2-benzyl-4-methyl-1,3-dioxolane, 2-benzyl-4,4-dimethyl-1,3-dioxolane, 2-benzyl-4-hydroxymethyl-1,3-dioxolane, 2-{2-(2-methoxyethoxy)ethoxy}-1,3-dioxolane, 2-benzyl-4,4-dimethyl-1,3-dioxane, 4-phenyl-1,3-dioxane, 2-benzyl-5,5- dimethyl-1,3-dioxane, or the like. These compound having cyclic acetal group may be used singly or in the form of the mixture thereof.

(6) Compounds Having Oxymethylene Units, Compounds having Substituted Oxymethylene Units or Substituted Cyclic Ether Compounds "Compounds having oxymethylene units, compounds having substituted oxymethylene units or substituted cyclic ether compounds" in the present invention may be the compounds having a structure in which at least three oxygen atoms and two carbon atoms are bonded in an alternate arrangement.

Specific examples of the compound having oxymethylene units, may include trioxane, paraldehyde, metacrolein, metaldehyde, paraformaldehyde, polyacetal, 2,5-dimethoxytetrahydrofuran, 2,5-diethoxytetrahydrofuran, 2,5-diphenoxytetrahydrofuran, 2,5-dimethoxy-3-formyltetrahydrofuran, 2,5-dimethoxy-2,5-dihydrofuran, 2,6-dimethoxytetrahydropyran or 2,6-diethoxytetrahydropyran. These compounds having oxymethylene unit may be used singly or in the form of the mixture thereof.

(7) Sulfonic Compounds

"Sulfonic compounds" in the present invention are the compounds having a sulfur dioxide structure in the molecule.

Specific examples of the sulfonic compounds may include dimethyl sulfone, dibutyl sulfone, diphenyl sulfone, dihydroxyphenyl sulfone, ditolyl sulfone, dixylyl sulfone, dimesityl sulfone, dinitrophenyl sulfone, diaminophenyl sulfone, dichlorophenyl sulfone, dimethoxyphenyl sulfone, divinyl sulfone, dicyclohexyl sulfone, dibenzyl sulfone, 1-propenyl methyl sulfone, methyl phenyl sulfone, methyl tolyl sulfone, methyl cyclohexyl sulfone, methyl methoxyphenyl sulfone, methyl chlorophenyl sulfone, methyl allyl sulfone, methyl benzyl sulfone, phenyl allyl sulfone, phenyl tolyl sulfone, phenyl xylyl sulfone, phenyl methoxyphenyl sulfone, phenyl vinyl sulfone, phenyl benzyl sulfone, phenyl styryl sulfone, phenyl cinnamyl sulfone, trimethyl 3-(phenylsulfonyl) orthopropionate, phenyl methoxymethyl sulfone, phenyl phenoxymethyl sulfone, phenylacetonyl sulfone, phenyl phenathyl sulfone, phenyl cyclohexyl sulfone, phenyl methylbenzene sulfone, phenyl methoxycarbonyl sulfone, tolyl allyl sulfone, tolyl butyl sulfone, tolyl phenathyl sulfone, tolyl benzyl sulfone, tolyl aminophenyl sulfone, tolyl chlorobenzyl sulfone, 4-(toluenesulfonyl)butane-2-on, benzyl allyl sulfone, trimethylene sulfone, tetramethylene sulfone, pentamethylene sulfone, benzothiophene dioxide, dibenzothiophene dioxide, thioxanthene-9,9-dioxide, 2,5-dihydroxythiophene-1,1-dioxide, 4-butylthian-1,1-dioxide, bis(methylsulfonyl)methane, 2,2-bis(methylsulfonyl)propane, bis(phenylsulfonyl)methane, 1,2-bis(phenylsulfonyl)ethane, 1,2-bis(phenylsulfonyl)ethylene, phenylsulfonyl-benzylsulfonyl-phenyl methane, 1,4-thioxane-1,1-dioxide, or the like. These sulfonic compounds may be used singly or in the form of the mixture thereof.

(8) Sulfoxide Compounds

"Sulfoxide compounds" in the present invention may be the compounds having a sulfur monoxide structure in the molecule.

Specific examples of the sulfoxide compounds may include dimethyl sulfoxide, dibutyl sulfoxide, diphenyl sulfoxide, dihydroxyphenyl sulfoxide, ditolyl sulfoxide, dibenzyl sulfoxide, divinyl sulfoxide, dixylyl sulfoxide, dimesityl sulfoxide, dinitrophenyl sulfoxide, diaminophenyl sulfoxide, dichlorophenyl sulfoxide, dimethoxyphenyl sulfoxide, dicyclohexyl sulfoxide, 1-propenyl methyl sulfoxide, methyl cyclohexyl sulfoxide, methyl phenyl sulfoxide, methyl tolyl sulfoxide, methyl methoxyphenyl sulfoxide, methyl chlorophenyl sulfoxide, methyl carboxyphenyl sulfoxide, methyl allyl sulfoxide, methyl benzyl sulfoxide, phenyl allyl sulfoxide, phenyl tolyl sulfoxide, phenyl xylyl sulfoxide, phenyl methoxyphenyl sulfoxide, phenyl vinyl sulfoxide, phenyl benzyl sulfoxide, phenyl styryl sulfoxide, phenyl cinnamyl sulfoxide, trimethyl-3-(phenylsulfinyl)ortho-propionate, phenyl methoxymethyl sulfoxide, phenyl phenoxymethyl sulfoxide, phenyl acetonyl sulfoxide, phenyl phenathyl sulfoxide, phenyl cyclohexyl sulfoxide, phenyl methylbenzyl sulfoxide, phenyl methoxycarbonyl sulfoxide, tolyl benzyl sulfoxide, tolyl butyl sulfoxide, tolyl phenathyl sulfoxide, tolyl butoxy sulfoxide, tolyl allyl sulfoxide, tolyl aminophenyl sulfoxide, tolyl chlorobenzyl sulfoxide, 4-(toluene-sulfinyl)butane-2-on, benzyl allyl sulfoxide, 2-pyridyl benzyl sulfoxide, acetonyl nitrophenyl sulfoxide, trimethylene sulfoxide, tetramethylene sulfoxide, pentamethylene sulfoxide, benzothiophene-1-oxide, dibenzothiophene-1-oxide, thioxanthene-9-oxide, 2,5-dihydroxythiophene-1-oxide, 4-butylthian-1-oxide, bis(methylsulfinyl)methane, 2,2-bis(methylsulfinyl)propane, bis(phenylsulfinyl)methane, 1,2-bis(phenylsulfinyl)ethane, 1,2-bis(phenylsulfinyl)ethylene, phenylsulfinyl-benzylsulfinyl-phenyl methane, 1,4-dithian-1,4-dioxide, polytetramethylene sulfoxide, polyhexamethylene sulfoxide, or the like. These sulfoxide compounds may be used singly or in the form of the mixture thereof.

(9) Sulfonic Acid-based Compounds

"Sulfonic acid-based compounds" in the present invention may be the compounds having a sulfur trioxide structure in the molecule.

Examples of the said sulfonic acid-based compounds include benzenesulfonic acid methyl ester, benzenesulfonic acid phenyl ester, toluenesulfonic acid methyl ester, toluenesulfonic acid ethyl ester, toluenesulfonic acid buthyl ester, toluenesulfonic acid phenyl ester, toluenesulfonic acid benzyl ester, toluenesulfonic acid phenethyl ester, toluenesulfonic acid naphthyl ester, xylenesulfonic acid methyl ester, xylenesulfonic acid phenyl ester, mesitylenesulfonic acid methyl ester, mesitylenesulfonic acid phenyl ester, benzenedisulfonic acid methyl ester, benzenedisulfonic acid phenyl ester, diphenyl sulfone-3-sulfonic acid methyl ester, diphenyl sulfone-3-sulfonic acid phenyl ester, benzenesulfonic acid methoxyethyl ester, toluenesulfonic acid methoxymethyl ester, toluenesulfonic acid methoxyethyl ester, toluenesulfonic acid ethoxyethyl ester, toluenesulfonic acid buthoxyethyl ester, toluenesulfonic acid phenoxyethyl ester, toluenesulfonic acid benzyloxyethyl ester, xylenesulfonic acid methoxyethyl ester, mesitylenesulfonic acid methoxyethyl ester, toluenesulfonic acid buthoxyethoxyethyl ester, toluenesulfonic acid phenoxyethoxyethyl ester, toluenesulfonic acid benzyloxyethoxyethyl ester, bistosyloxymethane, 1,2-bistosyloxyethane, diethyleneglycol-di-p-tosylate, tetraethyleneglycol-di-p-tosylate, naphthalenesulfonic acid methyl ester, naphthalenesulfonic acid phenyl ester, naphthalenedisulfonic acid diphenyl ester, 1,8-naphthisulton, tetramethylphosphonium benzenesulfonate, tetraethylphosphonium benzenesulfonate, tetrabuty,phosphonium benzenesulfonate, tetrahexylphosphonium benzenesulfonate, tetraoctylphosphonium benzenesulfonate, tetradecylphosphonium benzenesulfonate, tetramethylphosphonium toluenesulfonate, tetraethyiphosphonium toluenesulfonate, tetrabutylphosphonium toluenesulfonate, tetrahexylphosphonium toluenesulfonate, tetraocylphosphonium toluenesulfonate, tetradecyiphosphonium toluenesulfonate, tetramethylphosphonium dodecylbenzenesulfonate, tetraethyophosphonium dodecylbenzenesulfonate, tetrabutylphosphonium dodecylbenzenesulfonate, tetrahexylphosphonium dodecylbenzenesulfonate, tetraoctylphosphonium dodecylbenzenesulfonate, tetradecylphosphonium dodecylbenzenesulfonate, tetramethylammonium benzenesulfonate, tetradecylammonoium benzenesulfonate, trimethylbenzylammonium benzenesulfonate, tetrabutylammonium toluenesulfonate, tetralaurylammonium toluenesulfonate, triethylbenzylammonium toluenesulfonate, tetrapropylammonium dodecylbenzenesulfonate, and tetramethylbenzylammonium dodecylbenzenesulfonate. These compounds may be used either singly or as a mixture of two or more.

(10) Sulfide Compounds

"Sulfide compounds" in the present invention may be the compounds having a structure in which carbon atoms are bonded via one or more sulfur atom(s).

Examples of the said sulfide compounds include dimethyl sulfide, dimethyl disulfide, dimethyl trisulfide, diethyl sulfide, divinyl sulfide, diphenyl sulfide, diphenyl disulfide, diphenyl trisulfide, bis(hydroxyphenyl) sulfide, ditolyl sulfide, ditolyl disulfide, bis(nitro-phenyl) sulfide, bis(aminophenyl) sulfide, bis(chlorophenyl) sulfide, bis(methoxyphenyl) sulfide, dibenzoyl sulfide, dibenzoyl disulfide, dibenzyl sulfide, dibenzyl disulfide, dibenzyl trisulfide, dibenzyl tetrasulfide, dibenzyl pentasulfide, dibenzyl hexasulfide, dibenzyl heptasulfide, dibenzyl octasulfide, dicyclohexyl sulfide, dicyclohexyl disulfide, methyl cyclohexyl sulfide, methyl phenyl sulfide, methyl allyl sulfide, methyl benzyl sulfide, phenyl allyl sulfide, phenyl vinyl sulfide, phenyl benzyl sulfide, phenyl styryl sulfide, phenyl cinnamyl sulfide, phenyl benzoyl sulfide, phenyl phenacyl sulfide, phenyl cyclohexyl sulfide, tolyl benzyl sulfide, benzyl allyl sulfide, trimethylene sulfide, trimethylene disulfide, tetramethylene sulfide, tetramethylene disulfide, pentamethylene sulfide, thiophene, 4H-thiine, benzothiophene, dibenzothiophene, thiachromane, thiaxanthene, diethylthioacetal, α-phenyl-diethylthioacetal, 1,1-bis(ethylthio)propane, 1,1-bis(ethylthio)propene, 1,4-bis(methyldithio)cyclohexane, 1,3-dithiolan, 1,3-dithiane, 1,4-dithiane, 1,4-dithiene, 1,4-dithiadiene, thianthrene, 1,3,5-trithiane, polyphenylenesulfide, or the like. These sulfide compounds may be used singly or in the form of the mixture of two or more.

(11) Sulfonamide Compounds

"Sulfonamide compounds" in the present invention may be the compounds having a structure in which sulfur dioxide derived from sulfonic acid and an amine is bonded to nitrogen atom.

Examples of such sulfonamide compounds include benzenesulfonamide, benzenesulfonyl-N-methylamide, o-benzoic sulfimide, o-benzoic N-methylsulfimide, o-benzoic N-ethylsulfimide, o-benzoic N-phenylsulfimide, o-benzoic N-benzylsulfimide, o-naphthalenecarboxylic sulfimide, o-naphthalenecarboxylic N-methylsulfimide, o-naphthalenecarboxylic N-ethylsulfimide, o-naphthalenecarboxylic N-phenylsulfimide, o-naphthalenecarboxylic N-benzylsulfimide, toluenesulfonhydrazide, toluenesulfonanilide, toluenesulfonyl-N-butylamide, toluenesulfonyl-N-diethylamide, toluenesulfonyl-N-ethylamide, 1-(p-toluenesulfonyl)pyrrol, and 1-(p-toluenesulfonyl)imidazole. These sulfonamide compounds may be used either singly or as a mixture of two or more.

(12) Aromatic Compounds having Carbon-carbon Double Bond

"Aromatic compounds having carbon-carbon double bond" in the present invention may be the compounds having an aromatic ring and a carbon-carbon double bond in the molecule.

Examples of such aromatic compounds having carbon-carbon double bond include cinnamyl alcohol, cinnamic aldehyde, methoxycinnamic aldehyde, cinnamyl methyl ether, cinnamyl ethyl ether, cinnamyl allyl ether, cinnamyl phenyl ether, cinnamyl benzyl ether, cinnamyl naphthyl ether, cinnamyl methyl ketone, cinnamyl ethyl ketone, cinnamyl allyl ketone, cinnamyl phenyl ketone, cinnamyl benzyl ketone, cinnamyl acetate, cinnamyl propionate, cinnamyl butylate, cinnamyl benzoate, methyl cinnamate, methyl methylcinnamate, ethyl cinnamate, vinyl cinnamate, allyl cinnamate, phenyl cinnamate, benzyl cinnamate, cinnamyl cinnamate, naphthyl cinnamate, cinnamyl methyl carbonate, cinnamyl phenyl carbonate, allylbenzene, allyl phenyl ether, allyl benzoate and allyl phenylacetate. These aromatic compounds may be used either singly or as a mixture of two or more.

(13) Compounds Generating Active Radicals or Active Ions on Exposure to Ultraviolet Rays or Visible Light Rays "Compounds generating active radicals or active ions on exposure to ultraviolet rays or visible light rays" in the present invention may be the compounds which are capable of generating active radical species or active ionic species on absorbing light with a wavelength of 100 to 600 nm, and which are generally used as a photopolymerization initiator. The wavelength of light used for such activation is usually 200 to 500 nm, preferably 250 to 450 nm. Preferred examples of the compounds generating active radicals or active ions on exposure to ultraviolet rays or visible light rays are acetophenone-type compounds, benzophenone-type compounds, thioxanethone-type compounds, phosphoric compounds, acridone-type compounds and dicarbonyl-type compounds. These compounds may be used either alone or as a mixture of two or more.

The said "acetophenone-based compounds" may be the compounds of a structure in which an aromatic ring and a hydrocarbon group are bonded via a carbonyl group. Examples of such compounds include 2,2-diethoxyacetophenone, 2-hydroxy-2-methyl-1-phenylpropane-1-on, 2,2-dimethoxy-2-phenylacetophenone, 2-hydroxy-2-methyl-1-(4-(2-hydroxyethoxy)phenyl)propane-1-on, 1-hydroxycyclohexylphenyl ketone, 2-methyl-2-morpholino-1-(4-methylthiophenyl)propane-1-on, 2-benzyl-2-dimethylamino-1-(4-morpholinophenyl)-1-butanone, 2-hydroxy-2-phenylacetophenone, anisoin, 4,4'-dimethylbenzoin, 2-methoxy-2-phenylacetophenone, 2-ethoxy-2-phenylacetophenone, 2-propoxy-2-phenylacetophenone and 2-isobutoxy-2-phenylacetophenone.

The said "benzophenone-based compounds" may be the compounds of a structure in which two aromatic rings are bonded via a carbonyl group, examples thereof including 2-methylbenzophenone, 3-methylbenzophenone, 4-methylbenzophenone, 4-phenylbenzophenone, 2,5-dimethylbenzophenone, 3,4-dimethylbenzophenone, 4,4'-dimethylbenzophenone, 2,4,6-trimethylbenzophenone, methyl-2-benzoyl benzoate, and 4-benzoyl-4'-methyldiphenyl sulfide.

The said "thioxanethone-based compounds" may be the compounds having a heterocyclic structure in which two aromatic rings are bonded via a carbonyl group and a thioether group. Their examples include thioxanethone, 3-methylthioxanethone, 2-isopropylthioxanethone, 4-isopropylthioxanethone, and 2,4-diethylthioxanethone.

The said "phosphoric compounds" may be the phosphorus monoxide compounds in which two aromatic rings are bonded directly to phosphorus atom or one aromatic ring is bonded to a phosphorus atom via a carbonyl group. Example: 2,4,6-trimethylbenzoylphenylphosphine oxide.

The said "acridone-based compounds" may be the compounds having a heterocyclic structure in which two aromatic rings are bonded via a carbonyl group and a nitrogen atom. Example: 9(10H)-acridone.

The said "dicarbonyl-based compounds" may be the compounds having two or more carbonyl groups in the molecule. Examples of such compounds are methyl benzoylformate, ethyl benzoylformate, benzyl, anthraquinone, 2-ethylanthraquinone, 9,10-phenanthrenequinone, and camphorquinone.

The compounds generating active radicals or active ions on exposure to ultraviolet rays or visible light rays can be used with a sensitizer. Examples of the sensitizers usable in this invention include triethanolamine, methyldiethanolamine, triisopropanolamine, N,N-dimethylaniline, N,N-dimethylparatoluidine, methyl 4-dimethylaminobenzoate, ethyl 4-dimethylaminobenzoate, isoamyl 4-dimethylaminobenzoate, 2-ethylhexyl 4-dimethylaminobenzoate, 2-dimethylaminoethyl benzoate, 2-butoxyethyl 4-dimethylaminobenzoate, ethyl 2-dimethylaminobenzoate, 4-dimethylaminobenzoin, 4-dimethylaminoacetophenone, 4-dimethylaminobenzophenone, 4,4'-bis(dimethylamino) benzophenone, 4,4'-bis(diethylamino)benzophenone, and 2-dimethylamino-9-fluorenone.

(14) Aromatic Amine-based Compounds

"Aromatic amine-based compounds" in the present invention may be the compounds comprising tertiary amines having a carbonyl group and/or a carboxyl group.

Examples of such aromatic amine-based compounds include 4-dimethylaminobenzaldehyde, 4-diethylaminobenzaldehyde, 4-dimethylamino-1-naphthoaldehyde, 3-dimethylaminobenzoic acid, 4-dimethylaminobenzoic acid, 4-diethylaminobenzoic acid, methyl 4-dimethylaminobenzoate, ethyl 4-dimethylaminobenzoate, isoamyl 4-dimethylaminobenzoate, 2-ethylhexyl 4-dimethylaminobenzoate, 2-butoxyethyl 4-dimethylaminobenzoate, ethyl 2-dimethylaminobenzoate, 4-dimethylaminobenzoin, 4-dimethylaminoacetophenone, 4-dimethylaminobenzophenone, 4,4'-bis(dimethylamino) benzophenone, 4,4'-bis(diethylamino)benzophenone, and 2-dimethylamino-9-fluorenone. These aromatic amine-based compounds may be used either singly or as a mixture of two or more.

(15) Compounds having Saturated Heterocyclic Ring Containing Nitrogen

"Compounds having saturated heterocyclic ring containing nitrogen" in the present invention may be the compounds having one or more piperidine, piperadine, morpholine, pyrrolidine, pyrazolidine or imidazolidine rings.

Examples of such compounds include piperidine, 4-benzylpiperidine, N-methylpiperidine, 1-ethylpiperidine, 1-benzyl-4-hydroxypiperidine, 1-phenylpiperidine, 1-piperidineethanol, 1-(2,2-diethoxyethyl)piperidine, 4'-piperidinoacetophenone, 3-piperidino-1,2-propanediol, ethyl 1-methyl 3-piperidinecarboxylate, ethyl 1-methyl 2-piperdinecarboxylate, ethyl 3-methyl 1-piperidine propionate, ethyl 4-piperidinecarboxylate, ethyl 3-piperidinecarboxylate, ethyl 2-piperidinecarboxylate, ethyl 1-piperidineacetate, ethyl 1-piperidinepropionate, 1-acetylpiperidine, 1-acetyl 3-methylpiperidine, 1-formylpiperidine, 2-pipecoline, 4-pipecoline, piperazine, 2-methylpiperazine, 2,5-dimethylpiperazine, 2,6-dimethylpiperazine, N-methylpiperazine, 1,4-dimethylpiperazine, N-(hydroxyethyl)piperazine, 1-benzylpiperazine, 1,4-bis(2-hydroxyethyl)piperazine, 1-acetylpiperazine, t-butyl 1-piperazinecarboxylate, ethyl 1-piperazinecarboxylate, morpholine, 2,6-dimethylmorpholine, 4-methylmorpholine, 4-phenylmorpholine, 4-(2-hydroxyethyl)morpholine, 4'-morpholinoacetophenone, 4-morpholinobenzophenone, phomokine, 4-(2,5-diethoxy-4-nitrophenyl)morpholine, methyl morpholinepropionate, 2-methyl 4'-methylthio 2-morpholinepropiophenone, 4-formylmorpholine, 1-acetylmorpholine, 1-acetoacetylmorpholine, pyrrolidine, 1-butylpyrrolidine, t-butyl 1-pyrrolidinecarboxylate, 1-ethylpiperidine, 1-benzyl 3-hydroxypyrrolidine, 1-acetylpyrrolidine, 2-piperidone, 1-benzyl 4-piperidone, 1-carboethoxy 4-piperidone, 1-benzyl 2-pyrrolidinone, 1-benzyl 3-pyrrolidinone, 1-ethyl 2-pyrrolidinone, 1-octyl 2-pyrrolidinone, ethyl 1-azetidinepropionate, decahydroquinoline, 5-ethyl 1-aza-3,7-dioxabicyclo[3.3.0] octane, pyrazolidine, imidazolidine, 1,3-di(4-piperidyl) propane, 1,1'-methylenebis(3-methylpiperidine), dipiperidinomethane, 4,4'-trimethylenebis(1-methylpiperidine), bis(pentamethylene)urea, and 1,1'-carbonyldipyrrolidine. The compounds having saturated heterocyclic ring containing nitrogen also include various types of hindered amine-based light stabilizers commonly known as HALS. These compounds may be used either singly or as a mixture of two or more.

The amount of the ionizing radiation stabilizer (f) blended into the resin composition is usually 0.001 to 20 part by weight based on the combined amount (100 parts by weight) of the components (a) and (b). When the ratio of ionizing radiation stabilizer (f) (the ratio of halogen atoms derived from the halogenated aromatic compound in case of using such a compound as stabilizer) is less than 0.001 part by weight, the yellowing preventive effect against ionizing radiations is insufficient, and when the ratio exceeds 20 parts by weight, the composition becomes unsatisfactory in mechanical properties and heat resistance. The lower limit of the ratio of ionizing radiation stabilizer (f) is preferably 0.01 part by weight, more preferably 0.05 part by weight, most preferably 0.1 part by weight, and its upper limit is preferably 15 parts by weight, more preferably 10 parts by weight.

Besides the above-mentioned additives, the thermoplastic resin composition of the present invention may contain, depending on the purpose of its use, other polymers for affording the desired extra properties, flame-retardant, impact modifier, thermal stabilizer, UV absorber, antistatic agent, plasticizer, lubricant, compatibilizing agent, foaming agent, reinforcing agents and fillers such as glass fiber, glass beads, glass flakes, carbon fiber, fibrous magnesium, potassium titanate whisker, ceramic whisker, mica, talc, etc. These components may be used either singly or as a mixture of two or more.

For producing the thermoplastic resin composition of the present invention in case where the said additive is used, a method can be used in which the component materials are blended and kneaded in a way known in the art at any suitable stage in the process till the point just before molding of the final product. Blending can be effected by various methods, such as using a suitable mixer such as tumbler, Henschel mixer, etc., or supplying the measured amounts of the component materials to the extruder hopper by a feeder and mixing them in the extruder. Kneading can also be accomplished by suitable known methods such as using a single- or double-screw extruder.

The thermoplastic resin composition of the present invention can be molded into desired products by the conventionally used molding methods such as injection molding and blow molding. The molded products obtained from the thermoplastic resin composition of the present invention can be applied to a variety of commercial products, such as sheets, films, miscellaneous goods, parts of household electric appliances, automobile parts, building materials, hollow containers, medical supplies and appliances, etc., more specifically, roof panels for arcades, carports, indoor swimming pools, etc., light-transmitting molded articles such as sign boards, switch buttons, indicator buttons, indicator panels, meter panels, etc., delineators, signal lamps, sound insulating walls, automobile parts such as door window, rear quarter window, sunroof, rear panel garnish, headlight lens, tail lamp, etc., railroad light covers, camera lens, telephone jack, relay cover, terminal block cover, solar battery housing, water tank of iron, control box, pachinko ball case, ornamental jigs, ski goggles, protective spectacles, protective masks, artificial dialyzer, artificial lung case and its cap and connector, mineral water bottle, street lamp cover, etc.

Specific examples of molded product for the medical supplies and appliances include an artificial dialyzer, an artificial lung, an anesthetic inhaler, a vein connector or accessories, a hemo-centrifugal bowl, surgical appliances, appliances for an operation room, tubes for feeding oxygen into blood, connectors for tubes, cardiac probes and injectors, containers for the surgical appliances, the appliances for an operation room or an intravenous injection liquid, or the like.

Haze of the molded products obtained from the thermoplastic resin composition of the present invention, as determined with a 3 mm thick test piece, is ordinarily not more than 17%, preferably not more than 15%, more preferably not more than 10%. Deflection temperature under load of the molded pieces obtained from the thermoplastic resin composition of the present invention is generally not lower than 90° C., preferably not lower than 100° C.

The thermoplastic resin composition of the present invention described above is higher in deflection temperature under load, hence higher in heat resistance, than polyester resins, excels in chemical resistance in comparison with, for instance, polycarbonate resins, and also is low in haze and high in transparency, so that the present composition can be used very advantageously in applications where chemical resistance and heat resistance are required.

EXAMPLES

The present invention will be further illustrated by the following examples, but it should be understood that these examples are merely intended to be illustrative and not to be construed as limiting the scope of the invention. The materials and the evaluation methods used in the following Examples are as described below.

Transparent Thermoplastic Resins (1) Polycarbonate resin: "IUPILON S-2000" (viscosity-average molecular weight: 25,000) produced by Mitsubishi Engineering-Plastics Corporation.
(2) Polyarylate resin: "U Polymer U-100" produced by UNITIKA Ltd.
(3) Polystyrene resin: "Diarex HH-102" produced by A & M Styrene Co., Ltd.
(4) Refractory styrene-based resin: "Dylark #232" (hereinafter abbreviated as "D-232") produced by Sekisui Chemical Industries Co., Ltd.
(5) Methacrylic resin: "Acrypet VH" produced by Mitsubishi Rayon Co., Ltd.

Polyester Resins (for Examples)

(1) Copolyester resin: "Novapex NC102Z" produced by Mitsubishi Chemical Corporation, a polyethylene terephthalate resin obtained by copolymerizing 8 mol % of naphthalenedicarboxylic acid, intrinsic viscosity: 0.81
(2) Copolyester resin: "N10PET" produced by Mitsubishi Chemical Corporation, a polyethylene terephthalate resin obtained by copolymerizing 10 mol % of naphthalendicarboxylic acid, intrinsic viscosity: 0.80
(3) Copolyester resin: "N31PET" produced by Mitsubishi Chemical Corporation., a polyethylene terephthalate resin obtained by copolymerizing 31 mol % of naphthalenedicarboxylic acid, intrinsic viscosity: 0.50

Polyester Resins (for Comparative Examples)

(1) Polyethylene terephthalate resin: "Novapex GS400" produced by Mitsubishi Chemical Corporation, intrinsic viscosity: 0.70
(2) Copolyester resin: "Novapex NC900Z" produced by Mitsubishi Chemical Corporation, a polyethylene terephthalate resin obtained by copolymerizing 92 mol % of naphthalenedicarboxylic acid, intrinsic viscosity: 0.61
Polyester resin: "Novapex FS405Z" produced by Mitsubishi Chemical Corporation, a polyethylene naphthalate resin, intrinsic viscosity: 0.70

Antioxidant (c-1) Pentaerythrityl-tetrakis(3-(3,5-di-t-butyl-4-hydroxyphenyl) propionate
(c-2) Tris(2,4-di-t-butylphenyl) phosphite
(c-3) Distearyl acid phosphate Release Agent (d-1) Behenyl behenate
(d-2) Stearyl stearate
(d-3) Beeswax
(d-4) Stearic acid
(d-5) Pentaerythritol tetrastearate
(d-6) Glycerin monostearate
(d-7) Stearyl alcohol Weathering Resistance Improver (e-1) 2-(2-hydroxy-5-t-octylphenyl)-2H-benzotriazole
(e-2) bis(3-(2H-benzotriazole-2-yl)-2-hydroxy-5-octylphenyl)methane Ionizing Radiation Stabilizer (f-1) Halogenated polycarbonate resin: "IUPILON N-3" (bromine content: 4.46 weight %, viscosity-average molecular weight: 25,000) produced by Mitsubishi Engineering-Plastics Corporation.
(f-2) Halogenated polycarbonate resin: "IUPILON FR-53" (bromine content: 58.8 weight %, viscosity-average molecular weight: 7,300) produced by Mitsubishi Engineering-Plastics Corporation.

(f-3) Polyalkylene glycol compound: Uniol D-2000 produced by Nippon Yushi Co., Ltd. (polypropylene glycol; diol type)

(f-4) Polyalkylene glycol compound: Unisafe NKL-9520 produced by Nippon Yushi Co., Ltd. (polypropylene glycol; distearate type)

(f-5) Aromatic hydrocarbon-aldehyde resin: NIKANOL DS produced by Mitsubishi Gas Chemical Co., Ltd (no acetal group detected).

(f-6) Aromatic hydrocarbon-aldehyde resin: NIKANOL L produced by Mitsubishi Gas Chemical Co., Ltd (oxygen content: 10 weight %).

(f-7) Aromatic hydrocarbon-aldehyde resin: NIKANOL Y-50 produced by Mitsubishi Gas Chemical Co., Ltd (oxygen content: 18 weight %).

Evaluation Methods (1) Transparency: Haze was measured using 3 mm thick test pieces.
(2) Deflection temperature under load: Determined according to ASTM D648 under a load of 1.82 MPa.
(3) Chemical resistance: Testing chemicals were applied on a 3.2 mm thick tensile test piece in the state of being loaded with a strain with a deformation rate of 1%, and 48 hours later, the breaking energy retention ratio (ratio to the piece to which no testing chemical was applied) was determined. The testing chemicals used are:
  (a) PEG400: polyethylene glycol (produced by Nippon Yushi KK)
  (b) DOP: dioctyl phthalate (di(2-ethylhexyl) phthalate) (produced by Tokyo Chemical Industries Co., Ltd.)
  (c) TCP: tricresyl phosphate (produced by Tokyo Chemical Industries Co., Ltd.)
In some cases, the following criterion was used.
  ⊚: breaking energy retention ratio is not less than 80%.
  ○: breaking energy retention ratio is 60–80%.
  X: breaking energy retention ratio is less than 20%.
(4) Chemical resistance (2): 3.0 mm thick test pieces were immersed in the testing chemicals for 24 hours, and then the change of external appearance of the test pieces was visually examined. The following chemicals (a) and (b) were used for the test. Evaluation was made according to the following three-rank rating system.
Testing Chemicals
  (1) TCP: tricresyl phosphate (produced by Tokyo Chemical Industries Co., Ltd.)
  (2) ENK: ethyl nonyl ketone (3-decanone) (produced by Tokyo Chemical Industries Co., Ltd.)
Evaluation
  ○: No change.
  Δ: Became slightly cloudy or swollen.
  •: Became completely cloudy or swollen.
(5) Yellowness:
  A 3 mm-thick test specimen was measured using "SM Color Computer SM-3-CH" manufactured by SUGA Test Instruments Co., Ltd. to determine the YI value thereof.
(6) Molding stability:
  An injection molding of the resin composition was conducted under conditions of resin temperature of 280° C., molding temperature of 80° C. and one molding cycle time of 20 minutes. If silverstreaks are induced on the molded product, the molding stability is poor (X) and if no silverstreaks are induced on the molded product, the molding stability is good (○).
(7) Releasability:
  An injection molding of the resin composition was conducted to obtain a tumbler-shaped molded product under conditions of resin temperature of 280° C., molding temperature of 80° C. and pressure in the mold of 550 Kg/cm$^2$. If the releasability thereof was good, the evaluation is shown as ○, and the releasability thereof was poor the evaluation is shown as X. Releasing resistance (Kg) in releasing the molding from the mold was also determined.
(8) Light resistance:
  3.0 mm thick test pieces were subject to a treatment by HPUV (manufactured by ATLAS ELECTRIC DEVICES COMPANY) for 400 hours. The color difference (ΔE) between before and after treatment was determined by SM color computer SM-3-CH (manufactured by SUGA Test Instruments Co., Ltd.).
(9) Weather resistance:
  3.0 mm thick test pieces were subject to a treatment by High Power Energy Xenon Weather Meter XEL-3W (manufactured by Suga Testing Machine Co., Ltd.) for 1000 hours. The yellowness index difference (ΔYI) between before and after treatment was determined by SM color computer SM-3-CH (manufactured by SUGA Test Instruments Co., Ltd.).
(10) γ-ray resistance
  A test specimen having a diameter of 50 mm and a thickness of 3 mm was exposed to 25 kGy of a cobalt-60 gamma radiation and then they were measured the change in yellowness index (ΔYI) thereof. The measurements of the yellowness index of the test specimens were carried out according to JIS K7103 by using a color difference meter SM-3-CH (manufactured by SUGA Test Instruments Co., Ltd.).

EXAMPLES 1 TO 8 AND COMPARATIVE EXAMPLES 2 TO 5

A polycarbonate resin (S-2000) and the polyester resins shown in Table 1 were mixed in the ratios shown in the same table by a tumbler and extruded by a 40 mmφ single-screw vent type extruder at a barrel temperature of 270° C. to obtain pellets. These pellets were dried by a hot air drier at 120° C. for not less than 5 hours and injection molded at a resin temperature of 270° C. and a mold temperature of 80° C. to make the test pieces for determining properties. Results of the evaluation tests are shown in Table 1.

COMPARATIVE EXAMPLE 1

A polycarbonate resin (S-2000) was dried by a hot air drier at 120° C. for more than 5 hours and then injection molded in the same way as in Example 1 to make a test piece. Results of the evaluation tests are shown in Table 1.

EXAMPLES 9 AND 10 AND COMPARATIVE EXAMPLE 6

A polyarylate resin (U-100) and a copolyester resin (NC102Z) shown in Table 2 were mixed in the ratios shown in the same table by a tumbler and extruded by a 30 mmφ double-screw vent-type extruder at a barrel temperature of 360° C. to obtain pellets. In Comparative Example 6, pellets were molded from the polyarylate resin alone. These pellets were dried by a hot air dryer at 120° C. for 9 hours and then injection molded at a resin temperature of 360° C. and a mold temperature of 120° C. to make the test pieces for determining properties. Results of the evaluation tests are shown in Table 2.

EXAMPLE 11 AND COMPARATIVE EXAMPLE 7

A polystyrene resin (HH-102) and a copolyester resin (NC102Z) shown in Table 2 were mixed in the ratios shown in the same table by a tumbler and extruded by a 30 mmφ double-screw vent type extruder at a barrel temperature of 260° C. to obtain pellets. In Comparative Example 7, pellets were molded from the polystyrene resin alone. These pellets were dried by a hot air drier at 80° C. for 3 hours and then injection molded at a resin temperature of 260° C. and a mold temperature of 40° C. to make the test pieces for determining properties. Results of the evaluation tests are shown in Table 2.

EXAMPLES 12 AND 13 AND COMPARATIVE EXAMPLE 8

A refractory polystyrene resin (D-232) and a copolyester resin (NC102Z) shown in Table 2 were mixed in the ratios shown in the same table by a tumbler and extruded by a 30 mmφ double-screw vent type extruder at a barrel temperature of 260° C. to obtain pellets. In Comparative Example 8, pellets were molded from the refractory polystyrene resin alone. These pellets were dried by a hot air drier at 90° C. for 3 hours and injection molded at a resin temperature of 260° C. and a mold temperature of 60° C. to make the test pieces for determining properties. Results of the evaluation tests are shown in Table 2.

COMPARATIVE EXAMPLES 9 AND 10

A methacrylic resin (VH) and a copolyester resin (NC102Z) shown in Table 2 were mixed in the ratios shown in the same table by a tumbler and extruded by a 30 mmφ double-screw vent type extruder at a barrel temperature of 260° C. to obtain pellets. In Comparative Example 9, pellets were molded from the methacrylic resin alone. These pellets were dried by a hot air drier at 90° C. for 5 hours and injection molded at a resin temperature of 260° C. and a mold temperature of 60° C. to make the test pieces for determining properties. Results of the evaluation tests are shown in Table 2.

TABLE 1

| | Transparent thermoplastic resin | | Polyester resin | |
|---|---|---|---|---|
| | Type | Blending ratio (WT %) | Type | Blending ratio (WT %) |
| Example 1 | S-2000 | 99 | NC102Z | 1 |
| Example 2 | S-2000 | 90 | NC102Z | 10 |
| Example 3 | S-2000 | 80 | NC102Z | 20 |
| Example 4 | S-2000 | 70 | NC102Z | 30 |
| Example 5 | S-2000 | 50 | NC102Z | 50 |
| Example 6 | S-2000 | 99.75 | NC102Z | 0.25 |
| Example 7 | S-2000 | 99 | N10PET | 1 |
| Example 8 | S-2000 | 99 | N31PET | 1 |
| Comp. Example 1 | S-2000 | 100 | — | 0 |
| Comp. Example 2 | S-2000 | 90 | GS400 | 10 |
| Comp. Example 3 | S-2000 | 90 | NC900Z | 10 |
| Comp. Example 4 | S-2000 | 25 | NC102Z | 75 |
| Comp. Example 5 | S-2000 | 90 | FS405Z | 10 |

TABLE 1-continued

| | Haze (%) | Deflection temperature under load (° C.) | Chemical resistance (1) Breaking energy retention (%) | | |
|---|---|---|---|---|---|
| | | | PEG 400 | DOP | TCP |
| Example 1 | 0.6 | 135 | 87 | 84 | 78 |
| Example 2 | 1.7 | 133 | 93 | 81 | 94 |
| Example 3 | 4.9 | 130 | 84 | 49 | 72 |
| Example 4 | 7.4 | 127 | 22 | 98 | 97 |
| Example 5 | 8.9 | 114 | — | — | — |
| Example 6 | 0.3 | 136 | 87 | 78 | 89 |
| Example 7 | 0.3 | 136 | 32 | 95 | 94 |
| Example 8 | 0.7 | 136 | — | — | — |
| Comp. Example 1 | 0.4 | 136 | 2 | 12 | 50 |
| Comp. Example 2 | 18.1 | 132 | 39 | 57 | 93 |
| Comp. Example 3 | 91.5 | 135 | 90 | 86 | 90 |
| Comp. Example 4 | 6.1 | 81 | 17 | 20 | 13 |
| Comp. Example 5 | 92.0 | 134 | 2 | 36 | 99 |

TABLE 2

| | Transparent thermoplastic resin | | Polyester resin | |
|---|---|---|---|---|
| | Type | Blending ratio (WT %) | Type | Blending ratio (WT %) |
| Example 9 | U-100 | 90 | NC102Z | 10 |
| Example 10 | U-100 | 99 | NC102Z | 1 |
| Example 11 | HH-102 | 99 | NC102Z | 1 |
| Example 12 | D-232 | 90 | NC102Z | 10 |
| Example 13 | D-232 | 99 | NC102Z | 1 |
| Comp. Example 6 | U-100 | 100 | — | — |
| Comp. Example 7 | HH-102 | 100 | — | — |
| Comp. Example 8 | D-232 | 100 | — | — |
| Comp. Example 9 | VH | 100 | — | — |
| Comp. Example 10 | VH | 99 | NC102Z | 1 |

| | Haze (%) | Chemical resistance (2) | |
|---|---|---|---|
| | | TCP | ENK |
| Example 9 | 1.9 | — | — |
| Example 10 | 2.2 | — | — |
| Example 11 | 2.0 | Δ | ◯ |
| Example 12 | 1.8 | ◯ | ◯ |
| Example 13 | 0.5 | ◯ | ◯ |
| Comp. Example 6 | 3.0 | — | — |
| Comp. Example 7 | 0.3 | X | X |
| Comp. Example 8 | 0.4 | X | X |
| Comp. Example 9 | 0.4 | — | — |
| Comp. Example 10 | 53.8 | — | — |

EXAMPLES 14–20 AND COMPARATIVE EXAMPLES 11–13

A polycarbonate resin (S-2000), and the polyester resins and antioxidant shown in Table 3 were mixed in the ratios shown in the same table by a tumbler and extruded by a 30 mmφ double-screw vent type extruder at a barrel temperature of 280° C. to obtain pellets. These pellets were dried by a hot air drier at 120° C. for not less than 5 hours and injection molded at a resin temperature of 270° C. and a mold temperature of 80° C. to make the test pieces for determining properties. Results of the evaluation tests are shown in Table 4. In Table 3, the amount of antioxidant (c) is based on the combined amount (100 parts by weight) of the transparent aromatic thermoplastic resin (a) and the copolyester resin (b).

TABLE 3

| | Transparent thermoplastic resin (Polycarbonate) | | Polyester resin | | Antioxidant | |
|---|---|---|---|---|---|---|
| | Type | Blending ratio (WT %) | Type | Blending ratio (WT %) | Type | Blending ratio (WT %) |
| Ex. 14 | S-2000 | 99 | NC102Z | 1 | c-1 | 0.01 |
| Ex. 15 | S-2000 | 90 | NC102Z | 10 | c-2 | 0.05 |
| Ex. 16 | S-2000 | 80 | NC102Z | 20 | c-3 | 0.07 |
| Ex. 17 | S-2000 | 99 | N31PET | 1 | c-3 | 0.02 |
| Ex. 18 | S-2000 | 90 | NC102Z | 10 | c-1/c-2 | 0.02/0.02 |
| Ex. 19 | S-2000 | 90 | NC102Z | 10 | c-2/c-3 | 0.05/0.03 |
| Ex. 20 | S-2000 | 99 | NC102Z | 1 | c-1/c-2/c-3 | 0.02/0.02/0.01 |
| Comp. Ex. 11 | S-2000 | 90 | GS400 | 10 | c-1 | 0.01 |
| Comp. Ex. 12 | S-2000 | 90 | NC900Z | 10 | c-1 | 0.01 |
| Comp. Ex. 13 | S-2000 | 90 | FS405Z | 10 | c-1 | 0.01 |

TABLE 4

| | Haze (%) | Yellowness index | Chemical resistance (1) DOP | Molding stability Silver-streaks | Yellowness index |
|---|---|---|---|---|---|
| Ex. 14 | 0.5 | 1.7 | 82 | ○ | 2.5 |
| Ex. 15 | 1.1 | 2.0 | 80 | ○ | 2.6 |
| Ex. 16 | 4.0 | 1.5 | 60 | ○ | 2.0 |
| Ex. 17 | 0.5 | 2.3 | 63 | ○ | 2.8 |
| Ex. 18 | 1.1 | 1.8 | 87 | ○ | 2.6 |
| Ex. 19 | 1.2 | 2.0 | 83 | ○ | 2.5 |
| Ex. 20 | 0.4 | 1.5 | 86 | ○ | 1.8 |
| Comp. Ex. 11 | 18.2 | — | 51 | — | — |
| Comp. Ex. 12 | 91.8 | — | 89 | — | — |
| Comp. Ex. 13 | 92.0 | — | 38 | — | — |

EXAMPLES 21–29 AND COMPARATIVE EXAMPLES 14–16

A polycarbonate resin (S-2000), and the polyester resins, (c-2) tris(2,4-di-t-butylphenyl) phosphite as the antioxidant and release agent (d) shown in Table 5 were mixed in the ratios shown in the same table by a tumbler and extruded by a 65 mmφ single-screw vent type extruder at a barrel temperature of 280° C. to obtain pellets. These pellets were dried by a hot air drier at 120° C. for not less than 5 hours and injection molded at a resin temperature of 280° C. and a mold temperature of 80° C. to make the test pieces for determining properties. Results of the evaluation tests are shown in Table 6. In Table 5, the amounts of antioxidant and release agent are based on the combined amount (100 parts by weight) of the transparent aromatic thermoplastic resin (a) and the copolyester resin (b).

TABLE 5

| | Transparent thermoplastic resin (Polycarbonate: S-2000) Blending ratio (WT %) | Polyester resin Type | Blending ratio (WT %) | Release agent Type | Blending ratio (WT %) | Anti-Oxidant (c-2) Blending ratio (WT %) |
|---|---|---|---|---|---|---|
| Ex. 21 | 99 | NC102Z | 1 | d-1 | 0.1 | — |
| Ex. 22 | 90 | NC102Z | 10 | d-2 | 0.3 | 0.05 |
| Ex. 23 | 80 | NC102Z | 20 | d-3 | 0.5 | 0.05 |
| Ex. 24 | 99 | N31PET | 1 | d-3 | 0.05 | 0.05 |
| Ex. 25 | 90 | NC102Z | 10 | d-5 | 0.4 | 0.05 |
| Ex. 26 | 99 | NC102Z | 1 | d-2/d-4 | 0.2/0.02 | 0.05 |
| Ex. 27 | 99 | NC102Z | 1 | d-5/d-6 | 0.3/0.2 | 0.05 |
| Ex. 28 | 90 | NC102Z | 10 | d-6 | 0.3 | 0.05 |
| Ex. 29 | 90 | NC102Z | 10 | d-7 | 0.3 | 0.05 |
| Comp. Ex. 14 | 90 | GS400 | 10 | d-1 | 0.1 | 0.05 |
| Comp. Ex. 15 | 90 | NC900Z | 10 | d-1 | 0.1 | 0.05 |
| Comp. Ex. 16 | 90 | FS405Z | 10 | d-1 | 0.1 | 0.05 |

TABLE 6

| | Haze (%) | Chemical resistance (1) DOP | Releasability | Releasing resistance (Kg) |
|---|---|---|---|---|
| Ex. 21 | 0.5 | 83 | ○ | 506 |
| Ex. 22 | 1.1 | 82 | ○ | 403 |
| Ex. 23 | 4.0 | 63 | ○ | 372 |
| Ex. 24 | 0.5 | 67 | ○ | 579 |
| Ex. 25 | 1.1 | 88 | ○ | 365 |
| Ex. 26 | 0.5 | 84 | ○ | 394 |
| Ex. 27 | 0.6 | 77 | ○ | 360 |
| Ex. 28 | 1.2 | 74 | ○ | 411 |
| Ex. 29 | 1.2 | 71 | ○ | 398 |
| Comp. Ex. 14 | 18.4 | 58 | ○ | 505 |
| Comp. Ex. 15 | 91.8 | 88 | ○ | 497 |
| Comp. Ex. 16 | 92.1 | 39 | ○ | 485 |

EXAMPLES 30–33 AND COMPARATIVE EXAMPLES 17–20

A polycarbonate resin (S-2000), and the polyester resins, weathering resistance improver and if necessary (c-2) tris (2,4-di-t-butylphenyl) phosphite as the antioxidant the shown in Table 7 were mixed in the ratios shown in the same table by a tumbler and extruded by a 65 mmφ single-screw vent type extruder at a barrel temperature of 280° C. to obtain pellets. These pellets were dried by a hot air drier at 120° C. for not less than 5 hours and injection molded at a resin temperature of 280° C. and a mold temperature of 80° C. to make the test pieces for determining properties. Results of the evaluation tests are shown in Table 8. In Table 7, the amounts of antioxidant and weathering resistance improver are based on the combined amount (100 parts by weight) of the transparent aromatic thermoplastic resin (a) and the copolyester resin (b).

TABLE 7

| | Transparent thermoplastic resin (Polycarbonate: S-2000) Blending ratio (WT %) | Polyester resin Type | Blending ratio (WT %) | Weathering resistance improver Type | Blending ratio (WT %) | Anti-Oxidant (c-2) Blending ratio (WT %) |
|---|---|---|---|---|---|---|
| Ex. 30 | 99 | NC102Z | 1 | e-1 | 0.3 | — |
| Ex. 31 | 90 | NC102Z | 10 | e-2 | 0.3 | 0.02 |
| Ex. 32 | 99.7 | NC102Z | 0.3 | e-1 | 0.3 | — |
| Ex. 33 | 99 | N31PET | 1 | e-1 | 0.5 | 0.02 |
| Comp. Ex. 17 | 100 | — | — | — | — | 0.02 |
| Comp. Ex. 18 | 90 | GS400 | 10 | e-1 | 0.1 | — |
| Comp. Ex. 19 | 90 | NC900Z | 10 | e-1 | 0.1 | 0.02 |
| Comp. Ex. 20 | 90 | FS405Z | 10 | e-1 | 0.1 | 0.02 |

TABLE 8

| | Haze (%) | Chemical resistance (1) DOP | Light resistance ΔE | Weather resistance ΔYI |
|---|---|---|---|---|
| Ex. 30 | 0.5 | ⊚ | 0.4 | 17.6 |
| Ex. 31 | 1.1 | ⊚ | — | 19.9 |
| Ex. 32 | 0.4 | ◯ | — | 16.2 |
| Ex. 33 | 0.5 | ⊚ | — | 15.7 |
| Comp. Ex. 17 | 0.4 | X | 1.5 | 28.1 |
| Comp. Ex. 18 | 18.8 | — | — | — |
| Comp. Ex. 19 | 92.0 | — | — | — |
| Comp. Ex. 20 | 92.0 | — | — | — |

EXAMPLES 34–78 AND COMPARATIVE EXAMPLES 21–24

A polycarbonate resin (S-2000), and the polyester resins, ionizing radiation stabilizer and (c-2) tris(2,4-di-t-butylphenyl) phosphite as the antioxidant the shown in Tables 9–12 were mixed in the ratios shown in the same table by a tumbler and extruded by a 65 mmϕ single-screw vent type extruder at a barrel temperature of 280° C. to obtain pellets. These pellets were dried by a hot air drier at 120° C. for not less than 5 hours and injection molded at a resin temperature of 280° C. and a mold temperature of 80° C. to make the test pieces for determining properties. Results of the evaluation tests are shown in Table 13–15. In Tables 9–12, the amounts of antioxidant and ionizing radiation stabilizer are based on the combined amount (100 parts by weight) of the transparent aromatic thermoplastic resin (a) and the copolyester resin (b).

TABLE 9

| | S-2000 Blending ratio (WT %) | Polyester resin Type | Blending ratio (WT %) | Ionizing radiation stabilizer Type | Blending ratio (WT %) | Anti-Oxidant (c-2) Blending ratio (WT %) |
|---|---|---|---|---|---|---|
| Ex. 34 | 90 | NC102Z | 10 | IUPILON FR-53 | 1.7 | 0.02 |
| Ex. 35 | 80 | NC102Z | 20 | Benzyl alcohol | 0.5 | 0.02 |
| Ex. 36 | 99 | NC102Z | 1 | Dibenzyl ether | 0.5 | — |
| Ex. 37 | 99 | N31PET | 1 | Dibenzyl ketone | 0.5 | — |
| Ex. 38 | 99.5 | NC102Z | 0.5 | 4-methyl-2-phenyl-1,3-dioxolane | 1.0 | 0.02 |
| Ex. 39 | 99 | NC102Z | 1 | 2-benzyl-1,3-dioxolane | 0.5 | 0.02 |
| Ex. 40 | 99 | NC102Z | 1 | o-xylylene oxide | 0.2 | 0.02 |
| Ex. 41 | 99 | NC102Z | 1 | 4-phenyl-1,3-dioxane | 1.0 | 0.02 |
| Ex. 42 | 99 | NC102Z | 1 | Benzyl benzoate | 1.0 | 0.02 |
| Ex. 43 | 99 | NC102Z | 1 | 2,5-dimethoxy tetrahydrofuran | 0.5 | 0.02 |
| Ex. 44 | 99 | NC102Z | 1 | Trioxane | 0.5 | 0.02 |
| Ex. 45 | 99 | NC102Z | 1 | Diethoxy methane | 1.0 | 0.02 |
| Ex. 46 | 99 | NC102Z | 1 | D-2000 | 1.0 | 0.02 |
| Ex. 47 | 99 | NC102Z | 1 | 1,4-bis-methoxymethyl benzene | 0.5 | 0.02 |
| Ex. 48 | 99 | NC102Z | 1 | NIKANOL Y-50 | 0.5 | 0.02 |
| Ex. 49 | 99 | NC102Z | 1 | NIKANOL L | 0.6 | 0.02 |
| Ex. 50 | 99 | NC102Z | 1 | NIKANOL DS | 1.5 | 0.02 |

TABLE 9-continued

|  | S-2000 | Polyester resin | | Ionizing radiation stabilizer | | Anti-Oxidant (c-2) |
|---|---|---|---|---|---|---|
|  | Blending ratio (WT %) | Type | Blending ratio (WT %) | Type | Blending ratio (WT %) | Blending ratio (WT %) |
| Ex. 51 | 99 | NC102Z | 1 | cinnamyl alcohol | 0.3 | 0.02 |
| Ex. 52 | 99 | NC102Z | 1 | benzyl cinnamate | 0.5 | 0.02 |
| Ex. 53 | 99 | NC102Z | 1 | Allylbenzene | 0.5 | 0.02 |
| Ex. 54 | 99 | NC102Z | 1 | Dibenzyl sulfoxide | 0.7 | 0.02 |
| Ex. 55 | 99 | NC102Z | 1 | Dibenzyl sulfone | 0.5 | 0.02 |
| Ex. 56 | 99 | NC102Z | 1 | Methyl p-toluene sulfonate | 1.0 | 0.02 |
| Ex. 57 | 99 | NC102Z | 1 | Methoxyethyl p-toluene sulfonate | 0.5 | 0.02 |
| Ex. 58 | 99 | NC102Z | 1 | p-toluene sulfonyl-N-diethylamide | 1.0 | 0.02 |
| Ex. 59 | 99 | NC102Z | 1 | Dibenzylsulfide | 0.3 | 0.02 |
| Ex. 60 | 99 | NC102Z | 1 | Dicyclohexyl disulfide | 0.5 | 0.02 |
| Ex. 61 | 99 | NC102Z | 1 | 2,2-diethoxy acetophenone | 0.5 | 0.02 |
| Ex. 62 | 99 | NC102Z | 1 | Benzoin | 1.0 | 0.02 |
| Ex. 63 | 99 | NC102Z | 1 | 1-hydroxy cyclohexyl phenyl ketone | 1.0 | 0.02 |
| Ex. 64 | 99 | NC102Z | 1 | Ethyl dimethyl aminobenzoate | 1.0 | 0.02 |
| Ex. 65 | 99 | NC102Z | 1 | 1-acetyl morpholine | 0.5 | 0.02 |
| Ex. 66 | 99 | NC102Z | 1 | Benzophenone/ Ethyldimethyl aminobenzoate | 0.5/0.5 | 0.02 |
| Ex. 67 | 99 | NC102Z | 1 | FR-53/NKL-9520 | 0.85/0.5 | 0.02 |
| Ex. 68 | 99 | NC102Z | 1 | N-3/D-2000 | 5.6/0.3 | 0.02 |
| Ex. 69 | 99 | NC102Z | 1 | Paraldehyde/ 2-benzyl-1,3-dioxolane | 0.25/0.25 | 0.02 |
| Ex. 70 | 99 | NC102Z | 1 | 2,2'-trimethylene-bis-1,3-dioxolane/2,5-dimethoxy tetrahydrofuran | 0.3/0.2 | 0.02 |
| Ex. 71 | 99 | NC102Z | 1 | Dibenzyl ether/ NKL-9520 | 0.5/0.5 | 0.02 |
| Ex. 72 | 99 | NC102Z | 1 | NIKANOL L/ phenyl p-toluenesulfonate | 0.25/0.5 | 0.02 |
| Ex. 73 | 99 | NC102Z | 1 | 2-benzyl-1,3-dioxolane/ diphenyl sulfoxide | 0.5/0.5 | 0.02 |
| Ex. 74 | 99 | NC102Z | 1 | cinnamyl cinnamate/ D-2000 | 0.5/0.5 | 0.02 |
| Ex. 75 | 99 | NC102Z | 1 | Allyl phenyl ether/ NIKANOL Y-50 | 0.3/0.2 | 0.02 |
| Ex. 76 | 99 | NC102Z | 1 | Benzoin ethyl Ether 1,2-dibenzyloxy ethane | 0.25/0.25 | 0.02 |
| Ex. 77 | 99 | NC102Z | 1 | Dibenzyl ether/ D-2000/ 4-methyl-2-phenyl-1,3-dioxolane | 0.2/ 0.2/ 0.2 | 0.02 |

TABLE 9-continued

|  | S-2000 Blending ratio (WT %) | Polyester resin Type | Polyester resin Blending ratio (WT %) | Ionizing radiation stabilizer Type | Ionizing radiation stabilizer Blending ratio (WT %) | Anti-Oxidant (c-2) Blending ratio (WT %) |
|---|---|---|---|---|---|---|
| Ex. 78 | 99 | NC102Z | 1 | Dibenzyl ether/ NKL-9520/ Cinnamyl acetate | 0.2/ 0.4/ 0.2 | 0.02 |
| Comp. Ex. 21 | 100 | — | — | — | — | — |
| Comp. Ex. 22 | 90 | GS400 | 10 | D-2000 | 1.0 | 0.02 |
| Comp. Ex. 23 | 90 | NC900Z | 10 | D-2000 | 1.0 | 0.02 |
| Comp. Ex. 24 | 90 | FS405Z | 10 | D-2000 | 1.0 | 0.02 |

S-2000: Transparent thermoplastic resin (Polycarbonate)

TABLE 10

|  | Haze (%) | Chemical resistance (1) DOP | Ionizing radiation stability ΔYI |
|---|---|---|---|
| Ex. 34 | 1.2 | ◎ | 12.5 |
| Ex. 35 | 4.2 | ○ | 8.6 |
| Ex. 36 | 0.5 | ◎ | 8.8 |
| Ex. 37 | 0.6 | ◎ | 9.3 |
| Ex. 38 | 0.4 | ◎ | 6.7 |
| Ex. 39 | 0.5 | ◎ | 8.2 |
| Ex. 40 | 0.5 | ◎ | 3.8 |
| Ex. 41 | 0.5 | ◎ | 6.9 |
| Ex. 42 | 0.5 | ◎ | 9.8 |
| Ex. 43 | 0.5 | ◎ | 4.9 |
| Ex. 44 | 0.5 | ◎ | 8.2 |
| Ex. 45 | 0.5 | ◎ | 9.2 |
| Ex. 46 | 0.4 | ◎ | 11.7 |
| Ex. 47 | 0.5 | ◎ | 7.7 |
| Ex. 48 | 0.5 | ◎ | 6.1 |
| Ex. 49 | 0.5 | ◎ | 8.7 |
| Ex. 50 | 0.5 | ◎ | 8.6 |
| Ex. 51 | 0.5 | ◎ | 6.0 |
| Ex. 52 | 0.5 | ◎ | 8.9 |
| Ex. 53 | 0.5 | ◎ | 7.1 |
| Ex. 54 | 0.6 | ◎ | 4.6 |
| Ex. 55 | 0.6 | ◎ | 10.1 |
| Ex. 56 | 0.6 | ◎ | 11.0 |
| Ex. 57 | 0.6 | ◎ | 7.3 |
| Ex. 58 | 0.6 | ◎ | 7.0 |
| Ex. 59 | 0.6 | ◎ | 3.7 |
| Ex. 60 | 0.6 | ◎ | 5.4 |
| Ex. 61 | 0.5 | ◎ | 8.9 |
| Ex. 62 | 0.5 | ◎ | 6.1 |
| Ex. 63 | 0.5 | ◎ | 9.2 |
| Ex. 64 | 0.6 | ◎ | 10.9 |
| Ex. 65 | 0.6 | ◎ | 12.6 |
| Ex. 66 | 0.6 | ◎ | 10.2 |
| Ex. 67 | 0.5 | ◎ | 7.3 |
| Ex. 68 | 0.5 | ◎ | 10.0 |
| Ex. 69 | 0.5 | ◎ | 7.6 |
| Ex. 70 | 0.5 | ◎ | 4.0 |
| Ex. 71 | 0.4 | ◎ | 8.8 |
| Ex. 72 | 0.5 | ◎ | 7.7 |
| Ex. 73 | 0.6 | ◎ | 7.2 |
| Ex. 74 | 0.5 | ○ | 8.1 |
| Ex. 75 | 0.5 | ◎ | 6.4 |
| Ex. 76 | 0.4 | ◎ | 7.2 |
| Ex. 77 | 0.4 | ◎ | 7.6 |
| Ex. 78 | 0.4 | ◎ | 7.2 |
| Comp. Ex. 21 | 0.4 | X | 16.6 |
| Comp. Ex. 22 | 18.3 | — | — |
| Comp. Ex. 23 | 91.7 | — | — |
| Comp. Ex. 24 | 92.0 | — | — |

What is claimed is:

1. A thermoplastic resin composition comprising:
   a transparent aromatic thermoplastic resin (a) and
   a copolyester resin (b) comprising at least two kinds of dicarboxylic acid moieties and at least one kind of diol moiety wherein all of the diol moieties are selected from the group consisting of aliphatic diol moieties, aromatic diol moieties, ethylene oxide adducts of aromatic diol moieties and combinations thereof, 1 to 50 mol % of the dicarboxylic acid moieties being a naphthalenedicarboxylic acid moiety,
   the ratio of (a) to the combined amount of (a) and (b) being 55 to 99.99% by weight, and the ratio of (b) being 0.01 to 45% by weight, and
   said transparent aromatic thermoplastic resin (a) showing a visible light transmittance of not less than 80% when molded into a 3 mm thick product.

2. The thermoplastic resin composition according to claim 1, wherein the transparent aromatic thermoplastic resin (a) is a polycarbonate resin.

3. The thermoplastic resin composition according to claim 1, wherein the viscosity-average molecular weight of the transparent aromatic thermoplastic resin (a), as converted from the solution viscosity measured in methylene chloride at 25° C., is 10,000 to 100,000.

4. The thermoplastic resin composition according to claim 1, wherein 2 to 40 mol % of the dicarboxylic acid moieties in the copolyester resin (b) is a naphthalenedicarboxylic acid moiety.

5. The thermoplastic resin composition according to claim 1, wherein the dicarboxylic acid moiety other than naphthalenedicarboxylic acid in the copolyester resin (b) comprises an aromatic dicarboxylic acid moiety.

6. The thermoplastic resin composition according to claim 5, wherein the aromatic dicarboxylic acid is phthalic acid, isophthalic acid and/or terephthalic acid.

7. The thermoplastic resin composition according to claim 1, wherein the aliphatic diol is ethylene glycol or 1,4-butanediol.

8. The thermoplastic resin composition according to claim 1, wherein the intrinsic viscosity of the copolyester resin (b), as measured in a tetrachloroethane/phenol (5/5) mixed solvent at 30° C., is 0.3 to 2.0 dl/g.

9. The thermoplastic resin composition according to claim 1, wherein the ratio of (a) to the combined amount of (a) and (b) is 55 to 99.9% by weight and the ratio of (b) is 0.1 to 45% by weight.

10. The thermoplastic resin composition according to claim 1, wherein the ratio of (a) to the combined amount of (a) and (b) is 60 to 99.8% by weight and the ratio of (b) is 0.2 to 40% by weight.

11. The thermoplastic resin composition according to claim 1, wherein the ratio of (a) to the combined amount of (a) and (b) is 60 to 99.5% by weight and the ratio of (b) is 0.5 to 40% by weight.

12. The thermoplastic resin composition according to claim 1, further comprising an antioxidant (c) in an amount of 0.001 to 1 part by weight based on the combined amount (100 parts by weight) of the components (a) and (b).

13. The thermoplastic resin composition according to claim 12, wherein the antioxidant (c) is a phosphoric antioxidant, a phenolic antioxidant or mixture thereof.

14. The thermoplastic resin composition according to claim 1, further comprising a release agent (d) in an amount of 0.001 to 1 part by weight based on the combined amount (100 parts by weight) of the components (a) and (b).

15. The thermoplastic resin composition according to claim 14, wherein the release agent (d) is a compound having 10 or more carbon atoms in the molecule.

16. The thermoplastic resin composition according to claim 14, wherein the release agent (d) is higher fatty acid or ester thereof.

17. The thermoplastic resin composition according to claim 14, wherein the release agent (d) is a higher fatty acid ester of higher alcohol.

18. The thermoplastic resin composition according to claim 14, wherein the release agent (d) is a higher fatty acid whole ester of polyhydric alcohol.

19. The thermoplastic resin composition according to claim 1, further comprising a weathering resistance improver (e) in an amount of 0.001 to 10 part by weight based on the combined amount (100 parts by weight) of the components (a) and (b).

20. The thermoplastic resin composition according to claim 1, further comprising an ionizing radiation stabilizer (f) in an amount of 0.001 to 20 part by weight based on the combined amount (100 parts by weight) of the components (a) and (b).

21. A molded product comprising the thermoplastic resin composition as defined in claim 1.

22. A molded product comprising the thermoplastic resin composition as defined in claim 12.

23. A molded product comprising the thermoplastic resin composition as defined in claim 14.

24. A molded product comprising the thermoplastic resin composition as defined in claim 19.

25. A molded product comprising the thermoplastic resin composition as defined in claim 20.

26. The molded product according to claim 25, wherein said molded product has been sterilized by ionizing radiation.

27. Medical supplies comprising the molded product as defined in claim 20.

* * * * *